United States Patent
Shinkai et al.

(10) Patent No.: US 7,606,466 B2
(45) Date of Patent: Oct. 20, 2009

(54) RECORDING DEVICE AND METHOD FOR DATA OF MIXED FORMATS

(75) Inventors: Mitsutoshi Shinkai, Kanagawa (JP); Hideki Ando, Kanagawa (JP); Fumiaki Henmi, Kanagawa (JP); Takao Suzuki, Kanagawa (JP); Hisao Tanaka, Tokyo (JP); Hirofumi Murakami, Kanagawa (JP); Kenji Hyodo, Kanagawa (JP)

(73) Assignee: Sony Corporation, Tokyo (JP)

( * ) Notice: Subject to any disclaimer, the term of this patent is extended or adjusted under 35 U.S.C. 154(b) by 813 days.

(21) Appl. No.: 10/516,706

(22) PCT Filed: Mar. 31, 2004

(86) PCT No.: PCT/JP2004/004717

§ 371 (c)(1),
(2), (4) Date: Dec. 2, 2004

(87) PCT Pub. No.: WO2004/090891

PCT Pub. Date: Oct. 21, 2004

(65) Prior Publication Data
US 2005/0254774 A1    Nov. 17, 2005

(30) Foreign Application Priority Data
Apr. 3, 2003    (JP) .............................. 2003-100357

(51) Int. Cl.
*H04N 5/76* (2006.01)
(52) U.S. Cl. .......................................... 386/95; 386/125
(58) Field of Classification Search .................. 386/96, 386/101, 98, 124, 125, 126, 95, 131; 348/558, 348/553, 554
See application file for complete search history.

(56) References Cited

U.S. PATENT DOCUMENTS

| | | | | |
|---|---|---|---|---|
| 4,286,281 A | * | 8/1981 | Suzuki | 386/12 |
| 6,704,493 B1 | * | 3/2004 | Matthews et al. | 386/98 |
| 6,810,441 B1 | * | 10/2004 | Habuto et al. | 710/20 |
| 6,904,403 B1 | * | 6/2005 | Muraki et al. | 704/212 |
| 2004/0022519 A1 | * | 2/2004 | Lee | 386/52 |
| 2004/0170374 A1 | * | 9/2004 | Bender et al. | 386/46 |
| 2006/0114136 A1 | * | 6/2006 | Chu et al. | 341/52 |

FOREIGN PATENT DOCUMENTS

| | | |
|---|---|---|
| JP | 2000-11545 | 1/2000 |
| JP | 2000-30414 | 1/2000 |
| JP | 2000-82276 | 3/2000 |
| JP | 2003-18549 | 1/2003 |

* cited by examiner

Primary Examiner—David E Harvey
(74) Attorney, Agent, or Firm—Frommer Lawrence & Haug LLP; William S. Frommer; Paul A. Levy

(57) ABSTRACT

Video data of a plurality of different formats is mixedly recorded onto one disc-shaped recording medium so that they can be continuously reproduced. A clip is constructed by video data, audio data, auxiliary AV data, and time-sequential meta data which are time-sequentially associated. The data is managed by a directory structure. The data constructing the clip is collectively stored into clip directories under a directory CLPR. When the format of, for example, the video data is changed during the recording, the clip is divided at the changing position, a clip directory is newly formed, and a new clip is formed. The mixture existence of the formats among the clip directories is permitted. The mixture existence of the formats in the file stored in the clip directory is not permitted.

12 Claims, 21 Drawing Sheets

Fig. 2

| | |
|---|---|
| _RecStart | START POSITION OF RECORDING |
| _RecEnd | END POSITION OF RECORDING |
| _ShotMark1 | ARBITRARY POSITION 1 |
| _ShotMark2 | ARBITRARY POSITION 2 |
| _Cut | CUTTING POSITION |
| _Flash | FLASH DETECTING POSITION |
| _FilterChange | POSITION WHERE LENS FILTER IS CHANGED |
| _ShutterSpeedChange | POSITION WHERE SHUTTER SPEED IS CHANGED |
| _GainChange | POSITION WHERE GAIN IS CHANGED |
| _WhiteBalanceChange | POSITION WHERE WHITE BALANCE IS CHANGED |
| _OverBrightness | POSITION WHERE VIDEO OUTPUT LEVEL EXCEEDS 100% |
| _OverAudioLimiter | POSITION WHERE AUDIO OUTPUT LEVEL EXCEEDS LIMIT VALUE |
| _In-XXX | CUTTING START POSITION OF MATERIAL |
| _Out-XXX | CUTTING END POSITION OF MATERIAL |

Fig. 3

| KEY<br>(16 BYTES) | L<br>(1 BYTE) | VALUE<br>(MAX. 32 BYTES) |
|---|---|---|

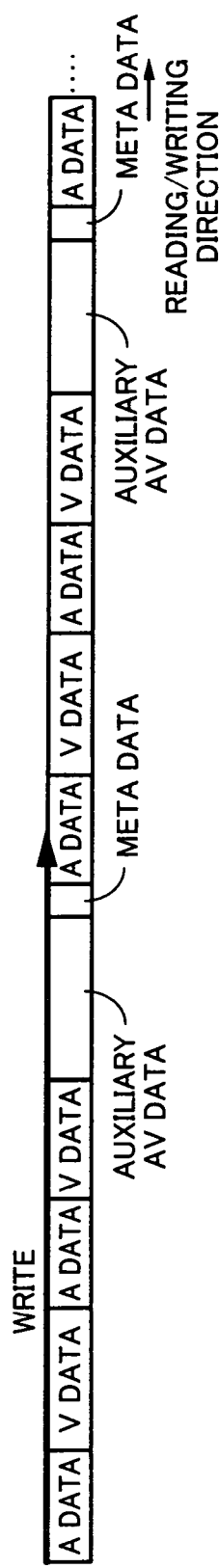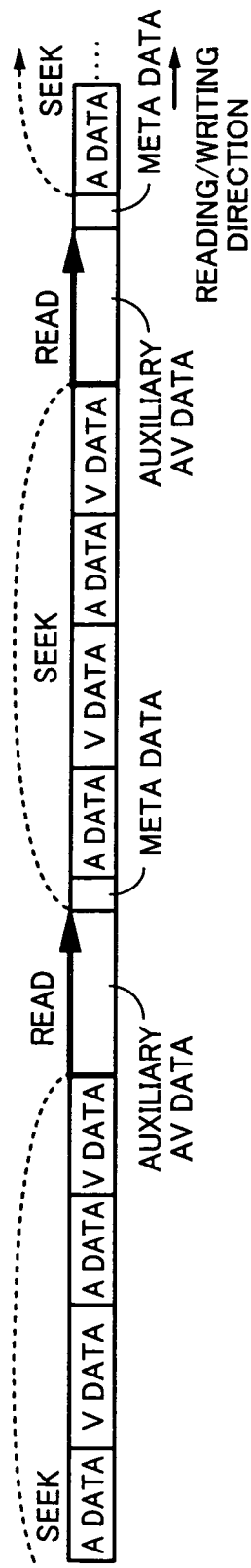

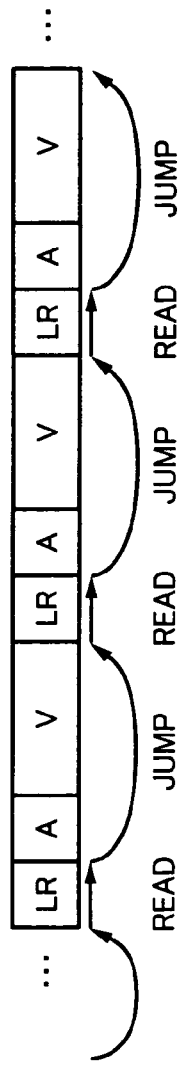
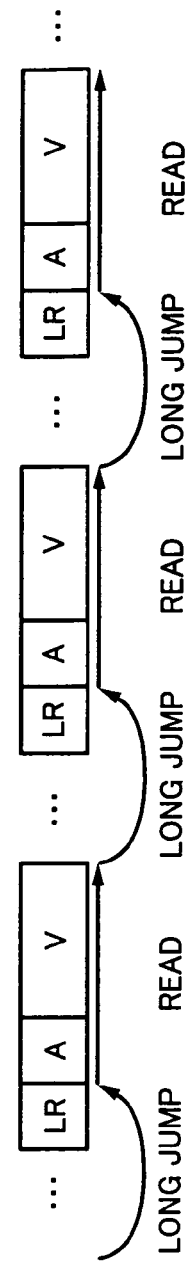
Fig. 6A
Fig. 6B
Fig. 6C

Fig. 11A

| Fig. 11 |
|---|
| Fig. 11A |
| Fig. 11B |
| Fig. 11C |
| Fig. 11D |

```
<!-- Definiton of VideoFormatType -->
<complexType name="VideoFormatType">
    <sequence>
        <element name="VideoRecPort" minOccurs="0">
            <complexType>
                <attribute name="port" type="lib:videoPortType" use="required"/>
            </complexType>
        </element>
        <element name="VideoFrame">
            <complexType>
                <attribute name="videoCodec" type="lib:videoCodecType"
                    use="required"/>
                <attribute name="captureFps" use="optional">
                    <simpleType>
                        <restriction base="string">
                            <pattern value="((¥d{3}|¥d{2}|¥d{1})(¥.¥d{2})?)?(p|i)"/>
                        </restriction>
                    </simpleType>
                </attribute>
                <attribute name="recFps" use="optional">
                    <simpleType>
                        <restriction base="string">
                            <pattern value="(¥d{3}|¥d{2}|¥d{1})(¥.¥d{2})?"/>
                        </restriction>
                    </simpleType>
                </attribute>
                <attribute name="formatFps" use="required" type="lib:fpsType"/>
                <attribute name="clipBegin" use="optional" default="0"
                    type="lib:frameCountType"/>
            </complexType>
        </element>
```

Fig. 11B

```
<element name="VideoLayout" minOccurs="0">
    <complexType>
        <sequence>
            <element name="PullDownSetting" minOccurs="0">
                <complexType>
                    <attribute name="pullDownKind" use="required">
                        <simpleType>
                            <restriction base="string">
                                <enumeration value="1-1"/>
                                <enumeration value="2-2"/>
                                <enumeration value="2-3"/>
                                <enumeration value="2-3-3-2"/>
                                <enumeration value="24-25"/>
                                <enumeration value="other"/>
                            </restriction>
                        </simpleType>
                    </attribute>
                    <attribute name="aFramePhase" use="required">
                        <simpleType>
                            <restriction base="string">
                                <pattern value="¥d{2}(¥-(0|1))?"/>
                            </restriction>
                        </simpleType>
                    </attribute>
                </complexType>
            </element>
        </sequence>
        <attribute name="pixel" type="unsignedShort" use="required"/>
        <attribute name="numOfVerticalLine" type="unsignedShort"
            use="required"/>
        <attribute name="aspectRatio" type="lib:aspectRatioType"
            use="optional"/>
    </complexType>
</element>
        </sequence>
</complexType>
```

Fig. 11C

```
<!-- Definiton of AudioFormatType -->
<complexType name="AudioFormatType">
    <sequence>
        <element name="AudioRecPort" minOccurs="1" maxOccurs="8">
            <complexType>
                <attribute name="port" type="lib:audioPortType"
                    use="required"/>
                <attribute name="audioCodec" type="lib:audioCodecType"
                    use="required"/>
                <attribute name="trackDst" type="lib:trackType"
                    use="required"/>
            </complexType>
        </element>
    </sequence>
    <attribute name="numOfChannel" type="lib:numOfChannelType" use="required"/>
      use="required"/>
</complexType>
```

Fig. 11D

```
<!-- Definiton of SubStreamType -->
<complexType name="SubStreamType">
    <attribute name="codec" type="lib:subStreamCodecType" use="required"/>
    <attribute name="clipBegin" use="optional" default="0"
    type="lib:frameCountType"/>
</complexType>
```

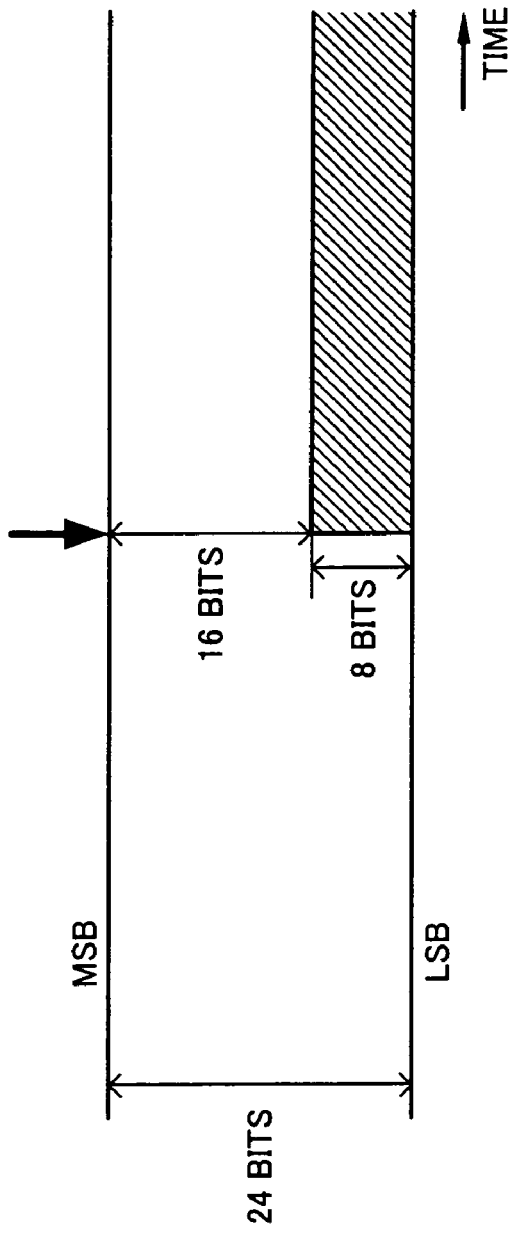
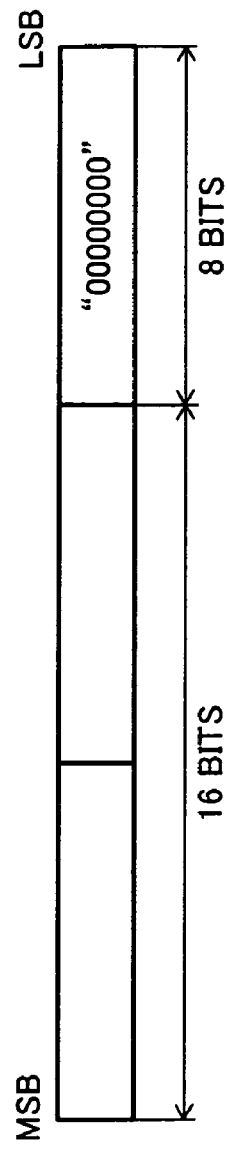
Fig. 17A
Fig. 17B

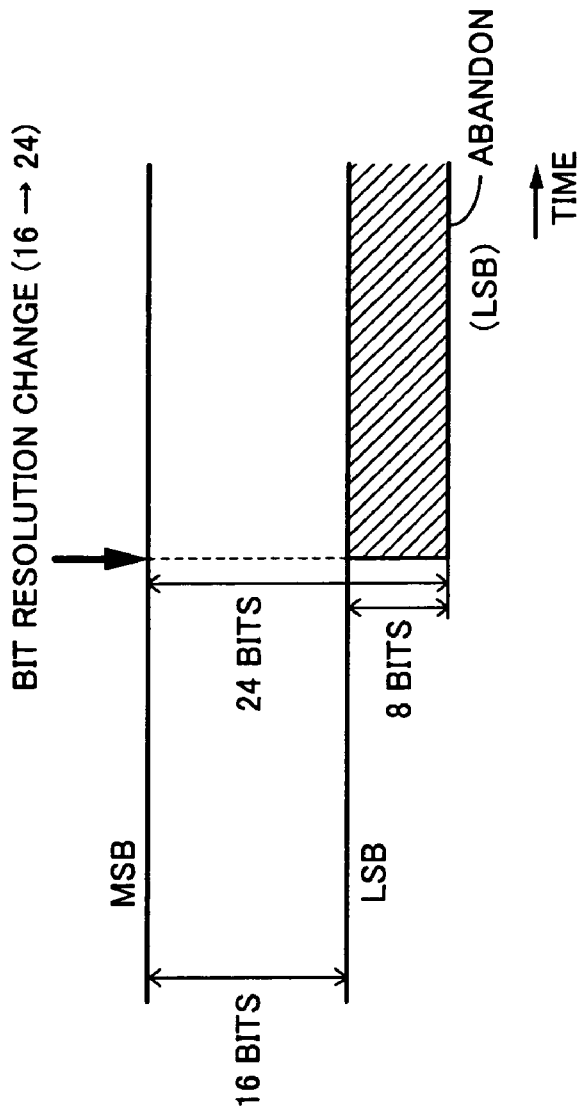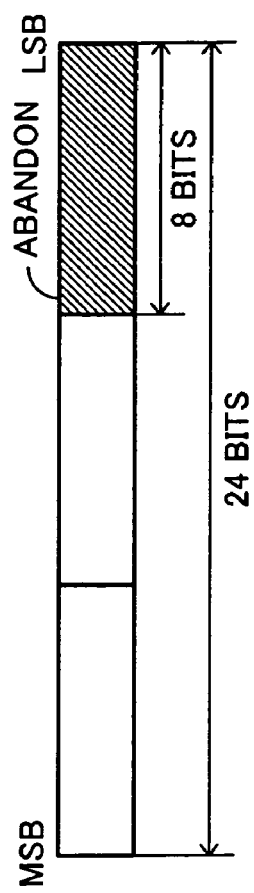
Fig. 18A
Fig. 18B

RECORDING DEVICE AND METHOD FOR DATA OF MIXED FORMATS

TECHNICAL FIELD

The invention relates to recording apparatus and method which can mixedly record video data in a plurality of different formats onto one disc-shaped recording medium so that they can be continuously reproduced.

BACKGROUND ART

In recent years, a disc-shaped recording medium in which a laser beam of a shorter wavelength is used as a light source, thereby enabling recording and reproduction of a larger capacity has been put into practical use. For example, a blue purple laser which emits a laser beam of a wavelength of 405 nm is used as a light source and a recording capacity of 23 GB (Gigabytes) has been realized by using an optical disc of a one-side single-layer structure.

In recent years, on the other hand, a variety of data formats of video data have been proposed in association with the realization of high fineness of an image in television broadcasting or the like. With respect to each of an encoding/decoding system, a bit rate of data, a frame rate, the number of pixels, an aspect ratio of a display screen, and the like, a plurality of kinds are generally used. In a manner similar to the above, in the case of audio data, with respect to each of bit resolution, an encoding/decoding system, and the like, a plurality of kinds are also generally used.

Further, in a video camera or the like, a method whereby a main video signal of high resolution is outputted and an auxiliary video signal of low resolution is formed on the basis of an image pickup signal has been proposed. The auxiliary video signal is suitable for use in the case where, for example, it is intended to transmit the video signal through a network as soon as possible, in the case of a shuttle operation at the time of searching for a head of a video image by a fast-forward or rewinding operation, or the like.

A video camera constructed in such a manner that the disc-shaped recording medium of the large capacity mentioned above is used, a main video signal of high resolution is outputted, and an auxiliary video signal of low resolution is formed has been disclosed in a Non-Patent Document "AV Watch editing division, "Sony, camcorder or the like using a blue purple laser disc", "Sony, camcorder or the like using a blue purple laser disc—has been exhibited in NAB 2003 opened on April. A studio recorder and the like have also been exhibited", [online], Mar. 5, 2003, Impress Corporation, AV Watch homepage (retrieved on Mar. 25, 2003, Internet <URL: http://www.watch.impress.co.jp/av/docs/20030305/Sony.htm>)".

In such a situation, it is demanded that audio/video data (hereinafter, referred to as AV data) in a plurality of different data formats are allowed to exist mixedly and can be continuously recorded or reproduced onto/from the disc-shaped recording medium of the large capacity mentioned above.

Hitherto, there is not such a technique that the AV data in a plurality of different data formats is mixedly and continuously recorded onto the recording medium, and the AV data in a plurality of different data formats is continuously reproduced and edited from the recording medium on which the AV data in a plurality of different data formats has been mixedly recorded.

DISCLOSURE OF INVENTION

It is, therefore, an object of the invention to provide recording apparatus and method which can mixedly record video data in a plurality of different formats onto one disc-shaped recording medium so that they can be continuously reproduced.

To solve the above problems, according to the invention, there is provided a recording apparatus for recording first video data and data which time-sequentially corresponds to the first video data onto a disc-shaped recording medium, wherein when a change in format is detected in at least one of the first video data which is continuously supplied and the data which is supplied so as to time-sequentially correspond to the first video data, each of the first video data and the data which is supplied so as to time-sequentially correspond to the first video data is divided at a position corresponding to the change and recorded onto the disc-shaped recording medium.

According to the invention, there is provided a recording method of recording first video data and data which time-sequentially corresponds to the first video data onto a disc-shaped recording medium, wherein when a change in format is detected in at least one of the first video data which is continuously supplied and the data which is supplied so as to time-sequentially correspond to the first video data, each of the first video data and the data which is supplied so as to time-sequentially correspond to the first video data is divided at a position corresponding to the change and recorded onto the disc-shaped recording medium.

As mentioned above, according to the invention, when the change in format is detected in at least one of the first video data which is continuously supplied and the data which is supplied so as to time-sequentially correspond to the first video data, each of the first video data and the data which is supplied so as to time-sequentially correspond to the first video data is divided at the position corresponding to the change and recorded onto the disc-shaped recording medium. Therefore, for example, even if the format of the first video data changes to a different format during the recording, the first video data before the format change and the first video data after the format change can be mixedly recorded onto the one disc-shaped recording medium together with the data which is supplied so as to time-sequentially correspond to the first video data.

BRIEF DESCRIPTION OF DRAWINGS

FIG. 2 is a schematic diagram showing an example of reservation words which are used to define an essence mark.

FIG. 3 is a schematic diagram showing a data structure of an example of the essence mark.

FIGS. 5A and 5B are schematic diagrams showing a state of an example in which reading and writing operations of data from/onto the optical disc on which annual rings have been formed are executed.

FIGS. 6A, 6B, and 6C are diagrams for explaining that data is recorded so that continuity of the annual rings is guaranteed.

FIGS. 11A, 11B, 11C, and 11D are schematic diagrams showing a description of an example of non-time-sequential meta data.

FIGS. 17A and 17B are diagrams for explaining processes at the time when bit resolution of audio data has been changed.

FIGS. 18A and 18B are diagrams for explaining processes when the bit resolution of audio data has been changed.

BEST MODE FOR CARRYING OUT THE INVENTION

Figure 1:
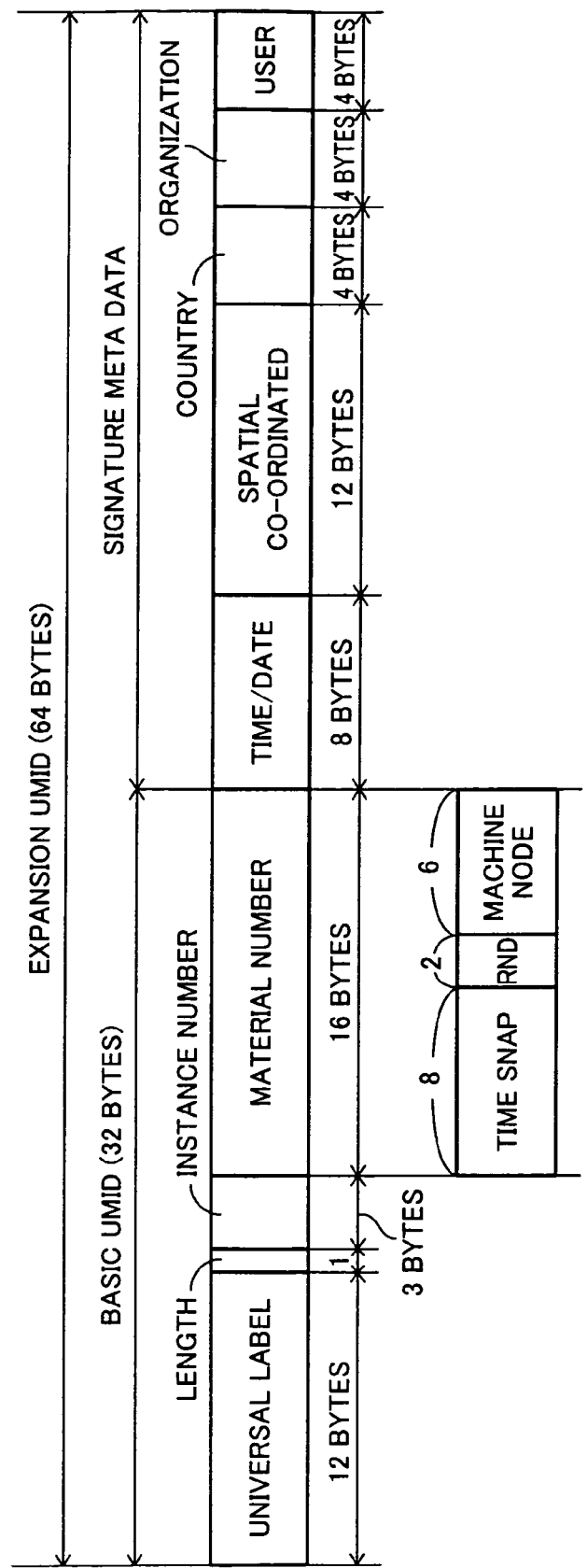
FIG. 1 is a schematic diagram showing a data structure of a UMID.

An embodiment of the invention will now be described hereinbelow. In the invention, a plurality of signal kinds (formats) of audio data and video data (hereinbelow, properly referred to as AV data) can be continuously and mixedly recorded onto one disc-shaped recording medium (hereinbelow, abbreviated to a disc) so that the plurality of signal kinds of AV data can be continuously reproduced.

The foregoing operation "a plurality of signal kinds of AV data are continuously and mixedly recorded onto one disc-shaped recording medium so that the plurality of signal kinds of AV data can be continuously reproduced" is properly referred to "can exist mixedly on one disc" or the like hereinbelow in order to avoid complication.

First, an example of signal kinds (formats) of data which can exist mixedly on one disc in the invention will be described.

As encoding systems, for example, an encoding system in which the video data is constructed only by an I picture according to an intraframe encoding in an MPEG2 (Moving Pictures Experts Group 2) system and an encoding system in which the video data is constructed by the I picture and a P picture and a B picture according to predictive encoding can exist mixedly on one disc. Naturally, encoding systems other than the MPEG2 system can also exist mixedly.

In the encoding system in which the video data is constructed only by the I picture, a GOP (Group Of Picture) as a unit of random access is constructed by one piece of I picture. Such a system is conveniently called a "single GOP system" hereinbelow. In the embodiment of the invention, a 4:2:2 profile of MPEG2 is applied to the single GOP system. In the encoding system in which the video data is constructed by using the I, P, and B pictures, the GOP starts with the I picture and includes one or a plurality of P and B pictures. Such a system in which the GOP is constructed by a plurality of frames is conveniently called a "long GOP system" hereinbelow.

With respect to the video data, for example, the video data of bit rate modes of 30 Mbps (Megabit per second), 40 Mbps, and 50 Mbps in the above single GOP system can exist mixedly on one disc. The video data of a bit rate mode of 25 Mbps in the long GOP can further exist mixedly on one disc. In the single GOP or long GOP, further another bit rate mode can also exist mixedly.

The bit rate mode is a mode for compression encoding the video data so that a bit rate value shown by the bit rate mode becomes a maximum value. For example, in the video data of the bit rate mode of 50 Mbps, actually, data of bit rates below 50 Mbps is included in transmission data in accordance with complexity or the like of an image. For a frame of a data amount which does not satisfy the bit rate shown by the bit rate mode, a difference of the data amounts between the actual bit rate and the bit rate shown by the bit rate mode is supplemented by predetermined padding data, thereby enabling an apparent bit rate to be set to the bit rate shown by the bit rate mode.

With respect to the video data, as a scanning system, data of an interlace system and data of a progressive system can exist mixedly on one disc. In each system, data of a plurality of frame rates can exist mixedly on one disc. In a screen size, data of an aspect ratio of 4:3 and data of an aspect ratio of 16:9 can be mixedly recorded onto one disc. For example, when the aspect ratio is equal to 4:3, data of SD (Standard Definition) of 640 pixels×480 lines and data of HD (High Definition) of 1440 pixels×1088 lines can exist mixedly on one disc. When the aspect ratio is equal to 16:9, data of a plurality of kinds of image sizes can also similarly exist mixedly on one disc.

Further, the color profile is also not limited to 4:2:2 mentioned above but other formats such as 4:2:0 and the like can exist mixedly.

With respect to the audio data, audio data encoded by a linear PCM (Pulse Code Modulation) (hereinafter, abbreviated to linear PCM audio data) and audio data encoded by an encoding system other than the linear PCM (for example, audio data obtained by further compression encoding the linear PCM audio data) can exist mixedly on one disc. The audio data corresponds to a plurality of kinds of bit resolution such as 16 bits and 24 bits and a plurality of channel sets such as 4 ch, 8 ch, and the like can exist mixedly on one disc.

In the embodiment of the invention, in addition to the AV data of the main line system mentioned above, that is, the AV data serving as a target of actual broadcasting or editing, auxiliary AV data and meta data corresponding to the AV data of the main line system are further recorded onto the same disc.

The auxiliary AV data is audio/video data of a lower bit rate based on the AV data of the main line system. The auxiliary AV data is formed by compression encoding the AV data of the main line system by reducing the bit rate to, for example, a few Mbps. Although a plurality of kinds of encoding systems for forming the auxiliary AV data exist as well as MPEG4, in the embodiment of the invention, the auxiliary AV data encoded by a plurality of different encoding systems can exist mixedly on one disc. The auxiliary AV data encoded by the same encoding system and by using different encoding parameters can also exist mixedly on one disc.

The meta data is upper data regarding certain data and functions as an index for showing contents of various data. As meta data, there are two kinds of meta data: time-sequential meta data which is generated along a time sequence of the AV data of the main line system mentioned above; and non-time-sequential meta data which is generated for a predetermined interval such as each scene in the AV data of the main line system.

In the time-sequential meta data, for example, a time code, a UMID (Unique Material Identifier), and an essence mark are inevitable data. Further, camera meta information such as iris and zoom information of a video camera upon photographing can be also included in the time-sequential meta data. Moreover, information specified in ARIB (Association of Radio Industries and Businesses) can be also included in the time-sequential meta data. Since data sizes of the data based on the ARIB and camera meta information are relatively large, it is desirable to allow them to exclusively exist mixedly. The camera meta information and the ARIB can be also included in the time-sequential meta data by time-division multiplex by reducing time resolution.

As non-time-sequential meta data, change point information such as time code and UMID, information regarding the essence mark, a user bit, and the like are included.

The UMID will be schematically explained. The UMID is an identifier which is solitarily determined in order to identify the video data, audio data, and other material data and has been standardized by SMPTE-330M.

FIG. 1 shows a data structure of the UMID. The UMID is constructed by: a basic UMID as ID information for identifying the material data; and signature meta data for identifying each contents in the material data. Each of the basic UMID and the signature meta data has a data area having a data length of 32 bytes. An area having a data length of 64 bytes obtained by adding the signature meta data to the basic UMID is called an expansion UMID.

The basic UMID is constructed by: an area "Universal Label (universal label)" having a data length of 12 bytes: an area "Length Value (length)" having a data length of 1 byte: an area "Instance Number (instance number)" having a data length of 3 bytes: and an area "Material Number (material number)" having a data length of 16 bytes.

A code for identifying that a data train which continues just after is the UMID is stored in the area "Universal Label". A length of the UMID is shown in the area "Length Value". Since lengths of codes of the basic UMID and the expansion UMID are different, the basic UMID is shown by a value [13 h] and the expansion UMID is shown by a value [33 h] in the area "Length Value". In the expression in the parentheses [ ], "h" shown after the numeral denotes that the numeral is expressed by a hexadecimal notation. Whether or not an overwriting process or an editing process has been performed to the material data is shown in the area "Instance Number".

The area "Material Number" comprises three areas: an area "Time Snap (time snap)" having a data length of 8 bytes: an area "Rnd" having a data length of 2 bytes: and an area "Machine node (machine node)" having a data length of 6 bytes. The area "Time Snap" shows the number of snap clock samples per day. Thus, the time of creation of the material data or the like is shown on a clock unit basis. The area "Rnd" is a random number for preventing a number from being overlappingly written when the incorrect time is set or when a network address of an apparatus defined by, for example, IEEE (Institute Electrical and Electronic Engineers) changes.

The signature meta data is constructed by: an area "Time/Date (time/date)" having a data length of 8 bytes; an area "Spatial Co-ordinated (spatial co-ordinated)" having a data length of 12 bytes; and an area "Country (country)", an area "Organization (organization)", and an area "User (user)" each having a data length of 4 bytes.

The time and date when the material has been formed are shown in the area "Time/Date". Correction information (time difference information) regarding the time when the material has been formed and position information shown by a latitude, a longitude, and an altitude are shown in the area "Spatial Co-ordinated". The position information can be obtained by, for example, providing a function corresponding to a GPS (Global Positioning System) for the video camera. A country name, an organization name, and a user name are shown in the area "Country", the area "Organization", and the area "User" by using abbreviated alphabetic characters, symbols, or the like, respectively.

In the case of using the expansion UMID as mentioned above, the data length of the UMID is equal to 64 bytes and its capacity is relatively large in order to sequentially record it in a time-sequential manner. Therefore, when the UMID is embedded into the time-sequential meta data, it is preferable to compress the UMID by a predetermined system.

So long as the UMID is used for the application of the embodiment of the invention, 10 to 13 bytes from the head of the UMID are set to a fixed value. Therefore, in the embodiment of the invention, 10 to 13 bytes from the head of the UMID can be omitted. When the UMID is stored into the time-sequential meta data, it can be encoded by a predetermined system. In this case, it is desirable to use Base64 as an encoding system because a result of the encoding is expressed by an ASCII code and it can be easily embedded into, for example, an XML document. Further, use of only the difference is also considered. For example, the UMIDs parts of which are set to be common is added to data which is generated into the same directory at the same time. By using them, the data amount can be reduced by using only the difference of the UMIDs.

The essence mark will be schematically explained. The essence mark indicates an index regarding video scene data as, for example, a video scene (or a cut) constructed in the video data upon photographing. By using the essence mark, what kind of scene can be grasped even without executing a reproducing process of the video scene data after the photographing.

In the embodiment of the invention, the essence mark is preliminarily defined as a reservation word. Therefore, for example, common control can be made without converting the essence mark in accordance with a partner apparatus among interfaces of an image pickup apparatus, a reproducing apparatus, and an editing apparatus.

FIG. 2 shows an example of reservation words which are used to define the essence mark. FIG. 2 merely shows an example and other essence marks can be further added and defined. "_RecStart" is a photographing start mark showing a start position of the recording. "_RecEnd" is a photographing end mark showing an end position of the recording. "_ShotMark1" and "_ShotMark2" are shot marks each showing an arbitrary position such as a time point to which an attention should be paid or the like. "_Cut" is a cut mark showing a cutting position. "_Flash" is a flash mark showing a flash detecting position obtained by detecting a position where a light emission of a flash has been performed. "_FilterChange" is a filter change mark showing a position where a lens filter has been changed in the image pickup apparatus. "_ShutterSpeedChange" is a shutter speed change mark showing a position where a shutter speed has been changed in the image pickup apparatus. "_GainChange" is a gain change mark showing a position where a gain of the filter or the like has been changed. "_WhiteBalanceChange" is a white balance change mark showing a position where a white balance has been changed. "_OverBrightness" is a mark showing a position where an output level of the video signal has exceeded a limit value. "_OverAudioLimiter" is a large sound volume mark showing a position where an output level of the audio signal has exceeded a limit value. Each of the foregoing marks is recorded, for example, on a frame unit basis of the video data.

"_In-XXX" is an editing start mark showing a cutting position or a cutting start position of the material. "_Out-XXX" is an editing end mark showing a cutting position or a cutting end position of the material. Each time an editing start point (IN point) or an editing end point (OUT point) is added, a numeral, alphabetic characters, or the like is sequentially numbered to the portion of "XXX" of each of the editing start mark and the editing end mark. For example, they are shown by "_In-001", "_In-002", . . . .

By using the essence marks defined as mentioned above as index information at the time of a coarse editing process, the target video scene can be efficiently selected.

FIG. 3 shows a data structure of an example of the essence mark. As described by using FIG. 2, the essence mark is the meta data in which a feature of the video scene or the like is expressed by text data and associated with video contents data (AV data of the main line system). The essence mark is KLV (Key Length Value) encoded and recorded or transmitted. FIG. 3 shows a format of the KLV encoded essence mark. This format conforms with a meta data dictionary of SMPTE 335M/RP210A.

The KLV encoded essence mark comprises: a "Key" portion having a data length of 16 bytes; a "L (length)" portion having a data length of 1 byte; and a "Value" portion having a data length of maximum 32 bytes. The "Key" portion is an identifier showing a KLV encoded data item which conforms with SMPTE 335M/RP210A. In this example, it is set to a value showing the essence mark. In the "L" portion, a length of data subsequent to the "L" portion is shown on a byte unit basis. The data length of maximum 32 bytes is expressed. The "Value" portion is an area comprising the text data in which the essence mark is stored.

A data arrangement onto the disc according to the embodiment of the invention will now be described. In the embodiment of the invention, the data is recorded so as to form annual rings onto the disc. The annual ring data is data which is recorded onto the disc by using a data amount shown by reproducing time of the data as a unit. For example, explanation will now be made by limiting the data to the audio data and the video data of the main line system. The audio data and the video data to which a reproducing time zone corresponds are alternately arranged and recorded every predetermined reproducing time unit having a data size of one or more circumferences of the track. By recording in this manner, a set of the audio data and the video data to which the reproducing time zone corresponds is time-sequentially multiplexed and the annual rings are formed.

In the embodiment, actually, in addition to the audio data and the video data to which the reproducing time zone corresponds, by recording the auxiliary AV data and the time-sequential meta data as a set in which the reproducing time zone corresponds to those data, the annual rings are formed, thereby recording the data onto an optical disc 1.

The data which forms the annual rings is called annual ring data. An amount of annual ring data is integer times as large as that of a sector as a minimum recording unit on the disc. The annual rings are recorded so that a boundary of them coincides with a boundary of the sectors of the disc.

Figure 4:
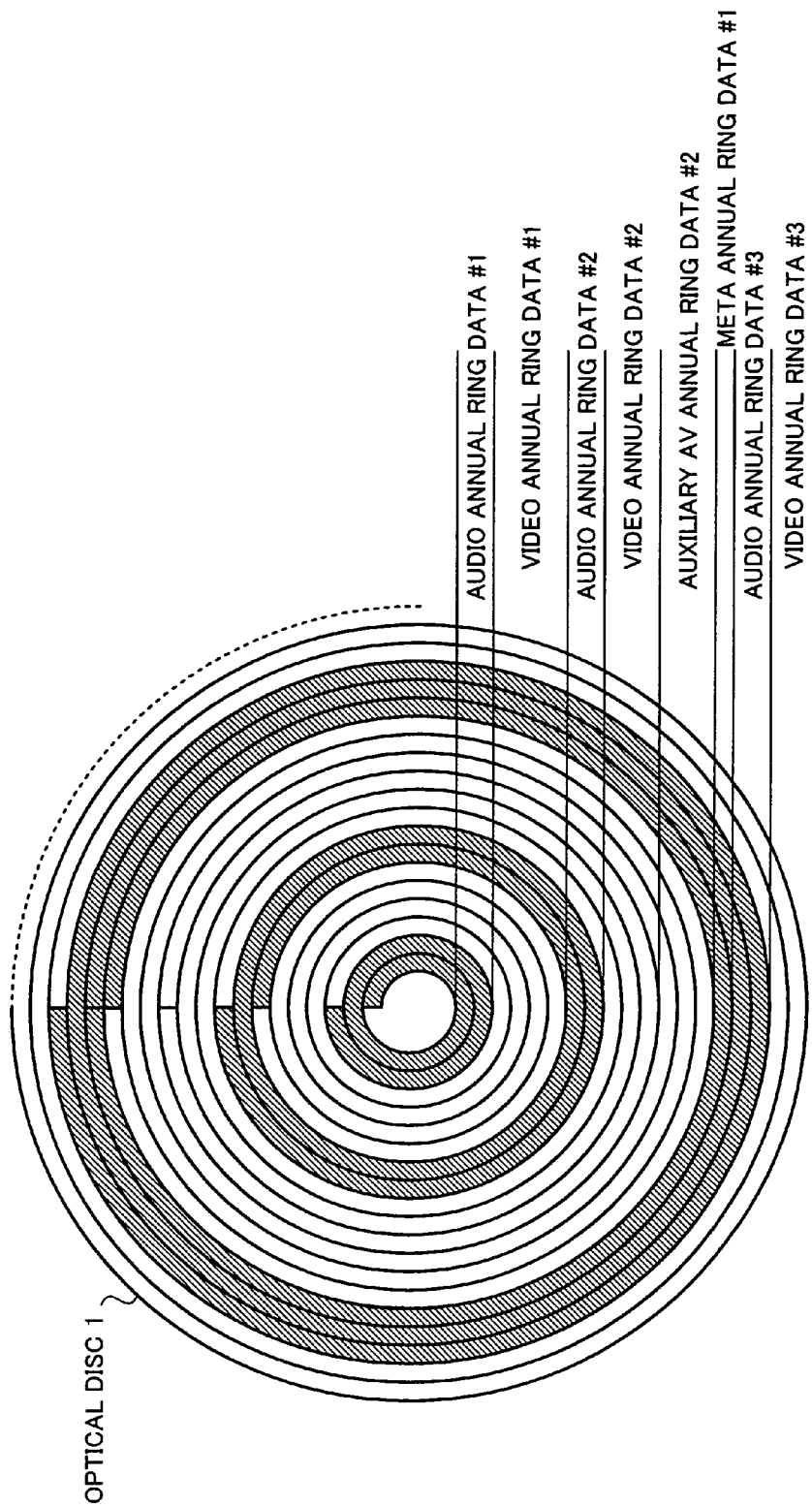
FIG. 4 is a schematic diagram showing a state of an example in which annual ring data has been formed on an optical disc.

FIG. 4 shows a state of an example in which the annual ring data has been formed on the optical disc 1. In the example of FIG. 4, audio annual ring data #1, video annual ring data #1, audio annual ring data #2, video annual ring data #2, auxiliary AV annual ring data #1, and time-sequential meta annual ring data #1 have been recorded in order from the inner rim side of the optical disc 1. The annual ring data is handled at this period. Further, a part of the annual ring data of the next period is shown as audio annual ring data #3 and video annual ring data #3 on the outer rim side of the time-sequential meta annual ring data #1.

In the example of FIG. 4, it is shown that a reproducing time zone of one annual ring data of the time-sequential meta annual ring data corresponds to a reproducing time zone of one annual ring data of the auxiliary AV annual ring data and a reproducing time zone of one annual ring data of the time-sequential meta annual ring data corresponds to a reproducing time zone of two periods of the audio annual ring data. Similarly, it is shown that a reproducing time zone of one annual ring data of the time-sequential meta annual ring data corresponds to a reproducing time zone of two periods of the video annual ring data. Such a correspondence between the reproducing time zone of each annual ring data and the period is set on the basis of, for example, the data rate of each data. It is preferable that the reproducing time of one annual ring data of the video annual ring data and the audio annual ring data is equal to about 1.5 to 2 seconds as an experimental value.

FIGS. 5A and 5B show a state of an example in which the reading and writing operations of data from/onto the optical disc 1 on which the annual rings have been formed as shown in FIG. 4 mentioned above are executed. In the case where a continuous empty area of a sufficient size exists on the optical disc 1 and there is no defect in the empty area, the audio annual ring data, the video annual ring data, the auxiliary AV annual ring data, and the time-sequential meta annual ring data formed from each of the data series of the audio data, the video data, the auxiliary AV data, and the time-sequential meta data on the basis of the reproducing time zone are written into the empty areas on the optical disc 1 as shown in an example in FIG. 5A as if they were drawn with a single stroke. At this time, the boundary of any of the data is written so as to coincide with the boundary of the sectors on the optical disc 1. The reading operation of the data from the optical disc 1 is also executed in a manner similar to that upon writing.

On the other hand, in the case of reading out a certain specific data series from the optical disc 1, the operation to seek the optical pickup to the recording position of the read data series and read out the data is repeated. FIG. 5B shows a state where a series of auxiliary AV data is selectively read out as mentioned above. For example, also referring to FIG. 4, when the auxiliary AV annual ring data #1 is read out, the recorded time-sequential meta annual ring data #1, audio annual ring data #3, video annual ring data #3, audio annual ring data #4 (not shown), and video annual ring data #4 (not shown) are subsequently jumped by seeking, and the auxiliary AV annual ring data #2 of the next period is read out.

By periodically executing the recording of the data onto the optical disc ion a unit basis of the reproducing time as annual ring data according to the reproducing time zone as mentioned above, the audio annual ring data and the video annual ring data of the similar reproducing time zone are arranged in close positions on the optical disc 1. Therefore, the audio data and the video data to which the reproducing time corresponds can be promptly read out and reproduced from the optical disc 1. Since they have been recorded so that the boundary of the annual rings and the boundary of the sectors coincide, only the audio data or the video data can be read out from the optical disc 1. Only the audio data or the video data can be promptly edited. As mentioned above, each of the audio annual ring data, the video annual ring data, the auxiliary AV annual ring data, and the time-sequential meta annual ring data has a data amount which is integer times as large as that of the sector of the optical disc 1, and further, they have been recorded so that the boundary of the annual ring data and the boundary of the sectors coincide. Therefore, when only the data of one series among the audio annual ring data, the video annual ring data, the auxiliary AV annual ring data, and the time-sequential meta annual ring data is necessary, only the necessary data can be read out without reading out the other data.

To make the most of convenience of the data arrangement according to the annual rings as mentioned above, it is necessary to execute the recording of the data onto the optical disc 1 so that continuity of the annual rings is guaranteed. This point will be described by using FIGS. 6A, 6B, and 6C. For example, the case of reading out only the auxiliary AV annual ring data (shown as "LR" in FIGS. 6A, 6B, and 6C) will now be considered.

For example, if the sufficiently large continuous empty areas are assured upon recording, the annual rings of a plurality of periods can be continuously recorded. In this case, as shown in FIG. 6A, the auxiliary AV annual ring data which continues with respect to time can be read out by the minimum track jump. That is, the operation in which after the auxiliary AV annual ring data is read out, the auxiliary AV annual ring data in the annual rings of the next period is read out can be repeated. A distance where a pickup jumps becomes the shortest.

On the other hand, for example, if the continuous empty areas cannot be assured upon recording and the auxiliary AV data which continues with respect to time has been recorded into separate areas on the optical disc 1, as shown in an example in FIG. 6B, after the first auxiliary AV annual ring data is read out, the pickup has to jump a distance corresponding to, for example, a plurality of periods of the annual rings and the next auxiliary AV annual ring data has to be read out. Since those operations are repeated, a reading speed of the auxiliary AV annual ring data decreases as compared with the case shown in FIG. 6A. In the AV data of the main line system, as shown in an example in FIG. 6C, there is a possibility that the reproduction of the non-edited AV data (AV clip) is obstructed.

In the embodiment of the invention, therefore, in order to guarantee the continuity of the annual rings, an allocation unit having a length of a plurality of periods of the annual rings is defined and, when the data is recorded by the annual rings, the continuous empty areas of a length over the allocation unit length defined by the allocation unit are assured.

Explanation will now be more practically made with reference to FIGS. 7A, 7B, 7C, and 7D. The allocation unit length is preset. The allocation unit length is set to a value which is plural times as large as the total reproducing time of each data which is recorded at one period of the annual rings. For example, assuming that the reproducing time corresponding to one period of the annual rings is equal to 2 seconds, the allocation unit length is set to 10 seconds. This allocation unit length is used as a scale for measuring a length of empty area on the optical disc 1 (refer to an upper right portion in FIG. 7A). As shown in an example in FIG. 7A, as an initial state, it is assumed that the used areas are arranged in three separate positions on the optical disc 1 and the portions sandwiched between the used areas are set to the empty areas.

Figures 7A, 7B, 7C, 7D:
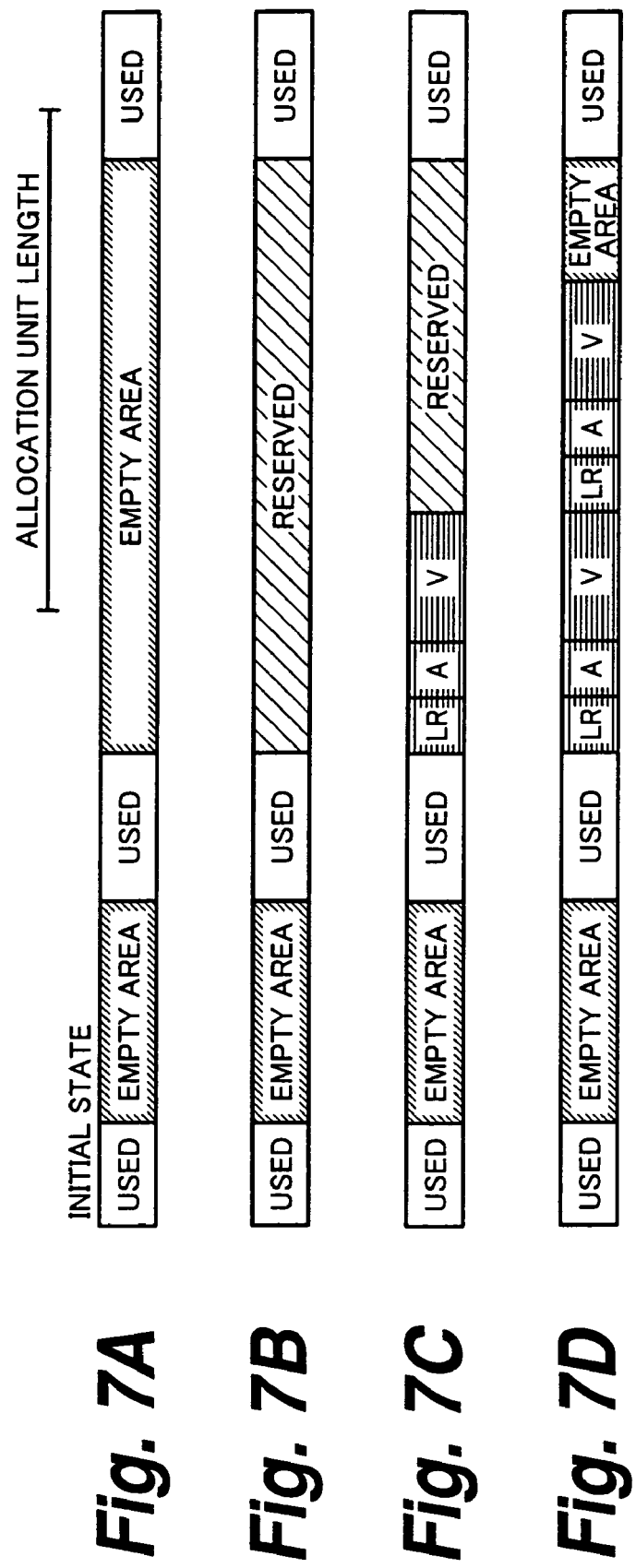
FIGS. 7A, 7B, 7C, and 7D are diagrams for explaining an allocation unit.

In the case of recording the AV data having a certain length and the auxiliary AV data corresponding to such AV data onto the optical disc 1, first, the allocation unit length is compared with the length of empty area and the empty area having a length which is equal to or longer than the allocation unit length is assured as a reserved area (FIG. 7B). In the example of FIG. 7A, the empty area on the right side in the two empty areas is longer than the allocation unit length and assured as a reserved area. Subsequently, the annual ring data is sequentially and continuously recorded from the head of the reserved area (FIG. 7C). The annual ring data is recorded in this manner. When the length of empty area of the reserved area is shorter than the length of one period of the annual ring data to be recorded next (FIG. 7D), the reserved area is opened. As shown in FIG. 7A, while the allocation unit length is applied to further another empty area on the optical disc 1, an empty area which can be set to the reserved area is searched for.

By searching for empty areas in which the annual rings of a plurality of periods can be recorded and recording the annual rings into this empty area, the continuity of the annual rings of a certain extent is guaranteed and the annual ring data can be smoothly reproduced. Although the allocation unit length has been set to 10 seconds in the above example, it is not limited to this example but a length corresponding to a further long reproducing time can be set as an allocation unit length. Actually, it is desirable to set the allocation unit length to a value within 10 to 30 seconds.

A management structure of data in the embodiment of the invention will now be described with reference to FIGS. 8, 9, and 10. In the embodiment of the invention, the data is managed by a directory structure. As a file system, for example, a UDF (Universal Disk Format) is used. As shown in an example in FIG. 8, a directory PAV is provided just under a root directory (root). In the embodiment, a structure under the directory PAV is defined.

That is, the mixture recording of a plurality of signal kinds of audio data and video data onto one disc is defined under the domination of the directory PAV. The recording of data to the directory PAV to which the data management in the embodiment of the invention is not applied is arbitrarily executed.

Four files (INDEX.XML, INDEX.RSV, DISCINFO.XML, and DISCINFO.RSV) are arranged just under the directory PAV and two directories (CLPR and EDTR) are provided.

The directory CLPR manages clip data. "Clip" mentioned here denotes one bundle of data which is obtained, for example, after the start of the photographing until the stop thereof. For example, in the operation of the video camera, data which is obtained after the depression of an operation start button until the depression of an operation stop button (until the operation start button is released) is set to one clip.

The "bundle of data" comprises: the audio data and video data of the main line system mentioned above; the auxiliary AV data formed from the audio data and video data; and the time-sequential meta data and non-time-sequential meta data corresponding to the audio data and video data. The bundle of data constructing the clip is stored every clip into directories "C0001", "C0002", . . . provided just under the directory CLPR.

Figure 9:
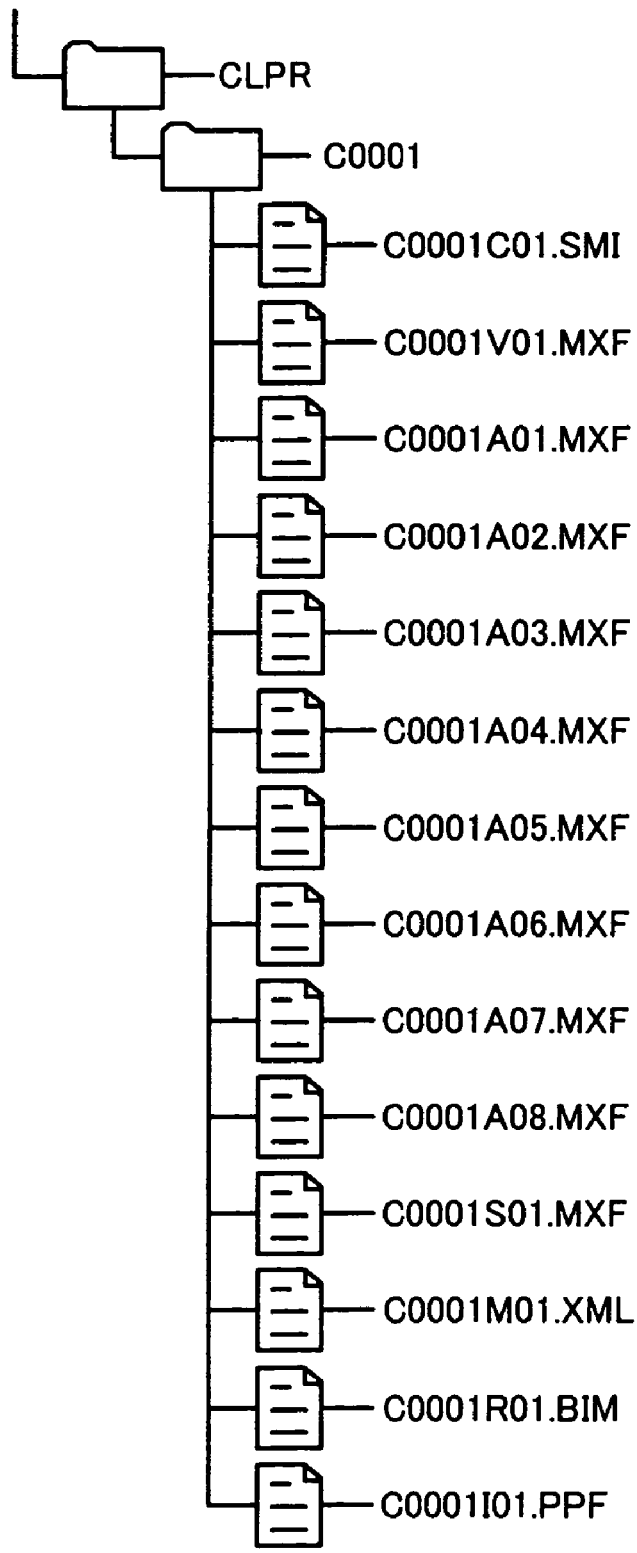
FIG. 9 is a diagram for explaining a management structure of data in the embodiment of the invention.

FIG. 9 shows a structure of an example of the directory "C0001" corresponding to one clip "C0001" provided just under the directory CLPR. The directory corresponding to one clip just under the directory CLPR is properly called a clip directory hereinbelow. Each of the foregoing bundle of data is distinguished by a file name and stored into the clip directory "C0001". In the example of FIG. 9, the file name is constructed by 12 digits, five digits on the front side among eight digits before a delimiter "." are used to identify the clip, and three digits just before the delimiter are used to indicate a type of data such as audio data, video data, or auxiliary AV data. Three digits after the delimiter are an extension and indicate a format of the data.

More specifically speaking, in the example of FIG. 9, as one bundle of files constructing the clip "C0001", the following files are stored into the clip directory "C0001": a file "C0001C01.SMI" showing clip information; a main line system video data file "C0001V01.MXF"; audio data files "C0001A01.MXF" to "C0001A08.MXF" of eight channels of the main line system; an auxiliary AV data file "C0001S01.MXF"; a non-time-sequential meta data file "C0001M01.XML"; a time-sequential meta data file "C0001R01.BIM"; and a pointer information file "C0001I01.PPF".

In the embodiment of the invention, the mixture existence of the foregoing data signal kinds among the clip directories in the directory CLPR is permitted. For example, with respect to the signal kind of the video data of the main line system, the video data of the single GOP and the bit rate of 50 Mbps can be stored into the clip directory "C0001" and the video data of the long GOP and the bit rate of 25 Mbps can be stored into the clip directory "C0002". On the other hand, the mixture existence of the data signal kinds in each data in the clip directories is not permitted. For example, in the video data, it is assumed that such a video data file that the data up to a certain time point from the head has been recorded at the bit rate mode of 50 Mbps and the data from this time point up to the end has been recorded at the bit rate mode of 25 Mbps cannot be stored.

Figure 8:
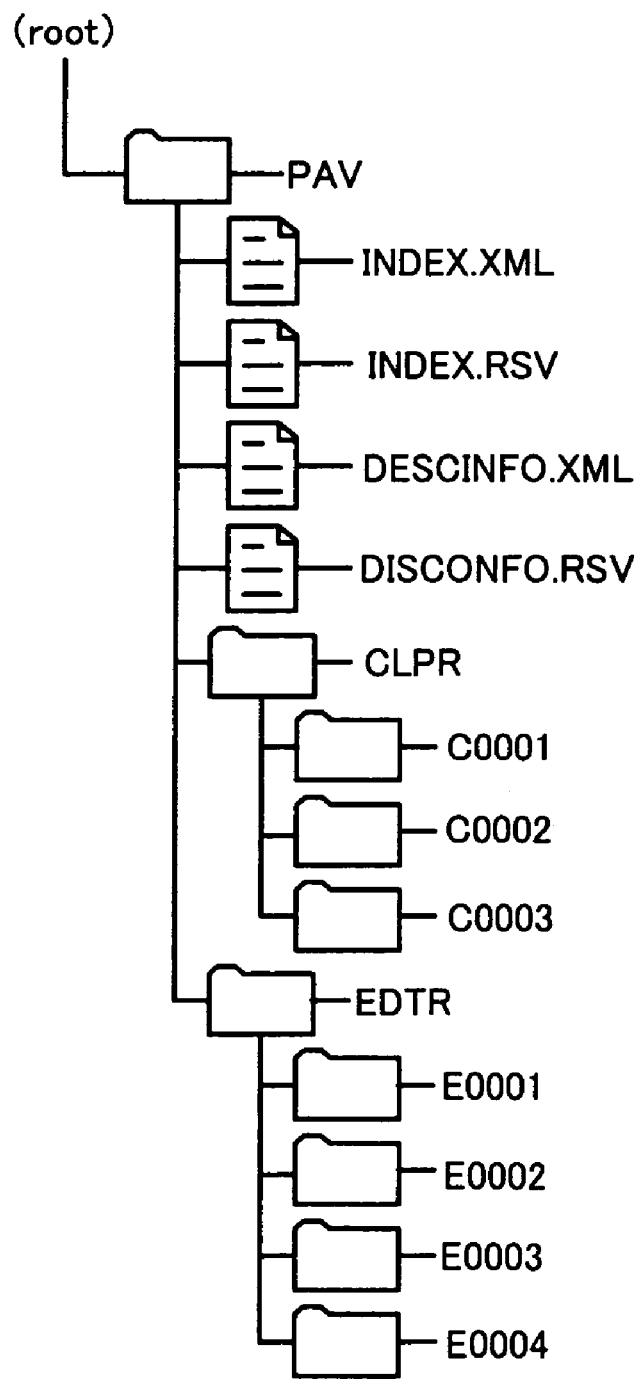
FIG. 8 is a diagram for explaining a management structure of data in an embodiment of the invention.

Explanation will be returned to FIG. 8. In a directory EDTR, edition information is managed. In the embodiment of the invention, an edition result is recorded as an edit list or a play list. A bundle of data constructing the edition result is stored every edition result into directories "E0001", "E0002", . . . provided just under the directory EDTR.

The edit list is a list in which edit points (IN point, OUT point, etc.), reproducing order, and the like for the clip are described. The edit list comprises a nondestructive edition result for the clip and a play list, which will be explained hereinafter. When the nondestructive edition result in the edit list is reproduced, continuous reproduction video images from a plurality of clips are obtained as if one edited stream were reproduced with reference to the files stored in the clip directories in accordance with the description on the list. However, in the nondestructive edition result, since the files in the list are referred to irrespective of the positions of the files on the optical disc 1, the continuity upon reproduction is not guaranteed.

According to the play list, if it is determined on the basis of the edition result that it is difficult to continuously reproduce the file which is referred to by the list or the portion of the file, by rearranging such a file or a part of the file into a predetermined area on the optical disc 1, the continuity upon reproduction of the edit list is guaranteed.

On the basis of the result in which the foregoing edit list has been formed by the editing work, management information (for example, index file "INDEX.XML", which will be explained hereinafter) of the file which is used for edition is referred to, and whether or not the file can be continuously reproduced in a nondestructive manner on the basis of the editing work, that is, in the state where the file which is referred to manner on the basis of the edition result is held in each clip directory is presumed. Thus, if it is determined that it is difficult to continuously reproduce, the relevant file is copied into the predetermined area on the optical disc 1. The file rearranged in the predetermined area is called a bridge essence file. The list in which the bridge essence file has been reflected to the edition result is called a play list.

For example, in the case where the edition result shows that a complicated clip is referred to, upon reproduction based on the edition result, there is a possibility of occurrence of a situation in which the seeking operation of the pickup is not in time when it is shifted from the clip to another clip. In such a case, the play list is formed and the bridge essence file is recorded into the predetermined area on the optical disc 1.

Figure 10:
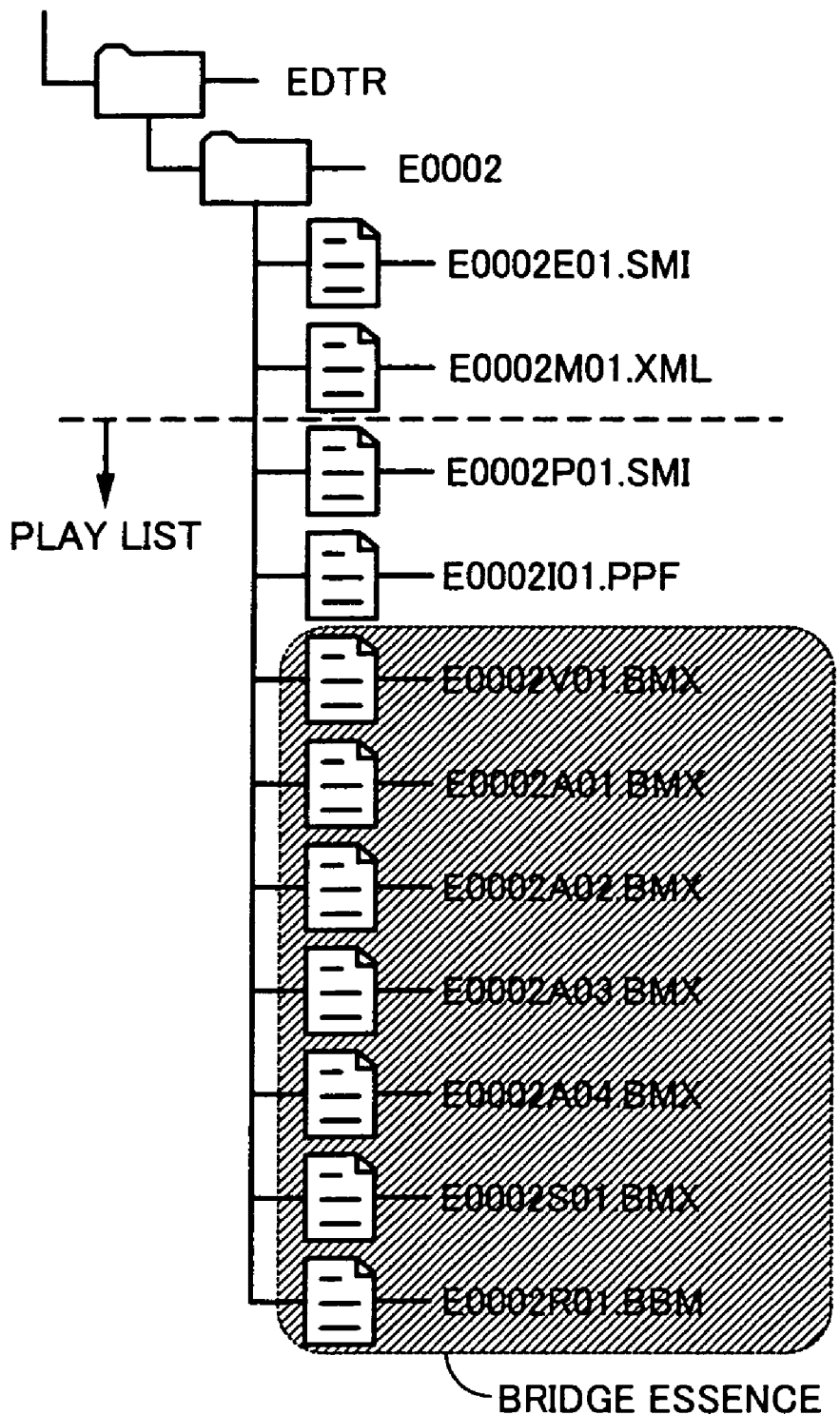
FIG. 10 is a diagram for explaining a management structure of data in the embodiment of the invention.

FIG. 10 shows a structure of an example of a directory "E0002" corresponding to one edition result "E0002" provided just under the directory EDTR. The directory corresponding to one edition result just under the directory EDTR is properly called an edit directory hereinbelow. The data formed by the foregoing edition result is distinguished by each file name and stored into the edit directory "E0002". The file name is constructed by 12 digits. Five digits on the front side among eight digits before the delimiter "." are used to identify the editing work. Three digits just before the delimiter are used to indicate a type of data. Three digits after the delimiter are an extension and indicate a format of the data.

More specifically speaking, in the example of FIG. 10, as files constructing the edition result "E0002", the following files are stored into the edit directory "E0002": an edit list file "E0002E01.SMI"; a file "E0002M01.XML" in which the information of the time-sequential meta data and the non-time-sequential meta data is described; a play list file "E0002P01.SMI"; bridge essence files "E0002V01.BMX" and "E0002A01.BMX" to "E0002A04.BMX" according to the data of the main line system; a bridge essence file "E0002S01.BMX" according to the auxiliary AV data; and a bridge essence file "E0002R01.BMX" according to the time-sequential meta data and the non-time-sequential meta data.

The files shown by a hatched region among the files stored in the edit directory "E0002", that is, the bridge essence files "E0002V01.BMX" and "E0002A01.BMX" to "E0002A04.BMX" according to the data of the main line system, the bridge essence file "E0002S01.BMX" according to the auxiliary AV data, and the bridge essence file "E0002R01.BMX" according to the time-sequential meta data and the non-time-sequential meta data are the files which belong to the play list.

As mentioned above, for example, the video data stored in the clip directories is referred to by the edit list. Since the mixture existence of the different data signal kinds is possible between the clip directories, the mixture existence of the different data signal kinds is eventually possible on the edit list.

Explanation will be returned to FIG. 8. A file "INDEX.XML" is an index file for managing material information stored in the files under the directory PAV. In this example, the file "INDEX.XML" is described in an XML (Extensible Markup Language) format. Each clip and the edit list mentioned above are managed by the file "INDEX.XML". For example, a conversion table of the file names and the UMIDs, the length information (Duration), the reproducing order of the materials when the whole optical disc 1 is reproduced, and the like are managed. The video data, the audio data, the auxiliary AV data, and the like which belong to the clips are managed and the clip information which is managed by the file is managed in the clip directory.

In the file "DISCINFO.XML", information regarding the disc is managed. Reproducing position information and the like are also stored in the file "DISCINFO.XML".

In the embodiment of the invention, when a predetermined change is detected in the bundle of data constructing the clip in a time interval after the start of the photographing until the stop thereof, the clip is divided in the position corresponding to the change detecting position and the portion after the dividing position is referred to as a new clip. A new directory corresponding to the new clip is automatically formed for the directory CLPR and a bundle of data constructing the new clip is stored into the formed directory.

The clip division is performed in the case where a change in signal kind (format) is detected in at least one of the video data and audio data constructing the clip. As conditions of the division, more specifically speaking, the following examples are considered. First, with respect to the video data, there are (1) Change in bit rate
(2) Change in frame rate
(3) Change in kind or phase of pull-down
(4) Change in image size
(5) Change in aspect ratio of the image
(6) Change in encoding system With respect to the audio data, there are (1) Change in bit resolution
(2) Change in sampling frequency
(3) Change in number of input channels
(4) Change in encoding system
(5) Change in meta data (non-audio) other than audio If a change is detected in any one of them, the clip is automatically divided at a position corresponding to the timing when the change has been detected. At this time, when a change is detected in certain data, other data which belongs to the same clip as that of the data is also divided at the same timing.

The data formats (for example, numerical values of the bit rates) of the video data and audio data accompanied with the clip division are recorded into one or both of the file headers of the non-time-sequential meta data and the clip. In other words, for example, the video data and audio data are recorded in accordance with the data format of the video data and audio data described in the non-time-sequential meta data.

FIGS. 11A, 11B, 11C, and 11D show a description of an example of the non-time-sequential meta data. In the example of FIGS. 11A, 11B, 11C, and 11D, the non-time-sequential meta data is described by using the XML (Extensible Markup Language). The XML is a language describing information by using a tag which can be uniquely defined. By using the XML, it is possible to allow the described information to have a specific meaning by the tag. According to the XML, since meaning information of parameters can be embedded into each tag of the XML file, a definition of a new parameter or the like can be easily performed, so that it has excellent expandability.

The tag of the XML file will be schematically explained. Generally, the tag comprises a pair of symbols each showing a start and an end of a range, can be embedded into a text, and can designate an arbitrary range. For example, the tag showing the start of the range is expressed by surrounding a predefined character train by symbols "<" and ">" and expressed (such a tag is called a start tag). The tag showing the end is expressed by surrounding the same character train as the character train described in the tag showing the start by symbols "</" and ">" and expressed (such a tag is called an end tag). For the range designated by the pair of tags, an arbitrary meaning can be provided by a character train surrounded between symbols "<" and ">" (or symbols "</" and ">"). A description of a predetermined parameter can be included in the tag. The tag can have a nesting structure. Ordinarily, in the description of the XML file, a nesting level is expressed by an extent of indent of each line.

In the example of FIGS. 11A, 11B, 11C, and 11D, for instance, the kind of data is described by a tag <complexType name> and the lower data kind is described by a tag <element name> to the tag <complexType name>. Attributes of the data of the data kinds designated by the tag <complexType name> and the tag <element name> are described by a tag <attribute>. For example, the timing when description contents of the tag <attribute> changes corresponds to the clip dividing position of the data of the data kind designated by the corresponding tag <complexType name>.

The clip division is not limited to the foregoing example but can be performed in accordance with a change in further other attributes of the video data and audio data. The clip division is not limited to the video data and audio data but can be also performed by detecting a predetermined change in the auxiliary AV data or the time-sequential meta data.

For example, with respect to the auxiliary AV data, the clip division can be performed, for instance, when the bit rate mode or the encoding system is changed. With respect to the time-sequential meta data, the clip division can be performed, for example, in the case where meta data according to ARIB and the camera data are exclusively recorded or in the case where there is a change in data kind between the ARIB and the camera data. Further, the clip division can be also performed when the data rate which has initially been set in order to transmit the time-sequential meta data is changed.

Moreover, it is also possible to construct in such a manner that the audio data of the main line system and the time-sequential meta data are not divided at the time of the clip division in association with the change in video data of the main line system. By using such a method, an increase in number of files due to the clip division can be suppressed. Also in this case, the auxiliary AV data is divided in association with a change in video data of the main line system.

Figure 12A:
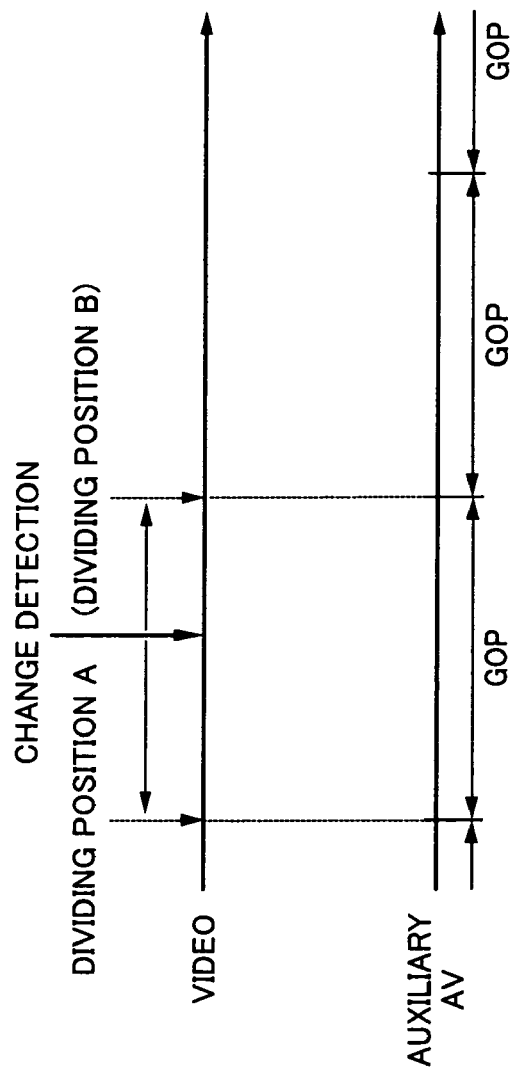
FIGS. 12A and 12B are diagrams for explaining a process for making a boundary of clip division coincide with a boundary of a GOP of auxiliary AV data.

At the time of the clip division, if the boundary of the division is made coincident with the boundary of the GOP of the auxiliary AV data, a relation between the time base in the clip and a byte offset is simplified, so that the processes become easy and it is preferable. Such a process is realized by a method whereby, for example, when the foregoing change is detected in the video data or audio data, the apparatus waits for the clip division till the next GOP boundary of the auxiliary AV data (dividing position B) or the clip division is executed while tracing back to the preceding GOP boundary (dividing position A) as shown in an example in FIG. 12A. It is actually desirable to execute the clip division at the dividing position B.

Figure 12B:
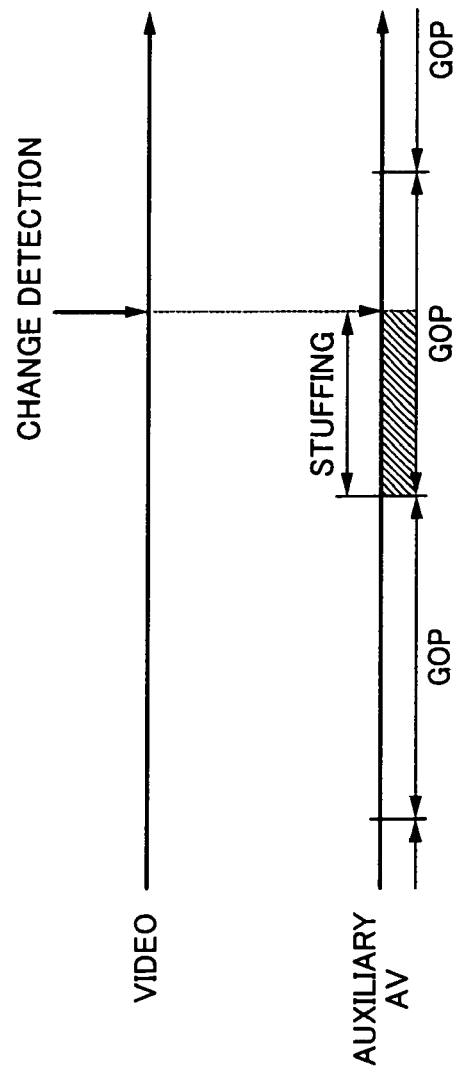

The invention is not limited to the above example but there is also a method whereby when the boundary of the division at the time of the clip division does not coincide with the GOP boundary of the auxiliary AV data, a residual portion of the GOP of the auxiliary AV data is filled with stuffing bytes and a data amount of the auxiliary AV data is equalized to that of another data such as video data or the like of the main line system. That is, as shown in an example in FIG. 12B, in the auxiliary AV data, for example, the GOP just before the position where the change is detected in the video data is set to the last GOP of the relevant clip and the portion from the boundary of the rear edge of the last GOP to the change detecting position (shown by a hatched region in FIG. 12B) is filled with the stuffing bytes.

If the video data of the main line system is based on the single GOP, the clip division can be executed at an arbitrary frame position. On the other hand, if the video data of the main line system is based on the long GOP, there is a possibility that the frame at the clip dividing position is a frame according to the P picture or B picture by the predictive encoding. Therefore, in the case of performing the clip division to the video data of the long GOP, the GOP is once completed at the clip dividing position. Such a process can be realized by a method whereby, for example, in the case where the frame just before the dividing position is the B picture, this frame is converted into the P picture or the I picture.

Upon clip division, it is also possible to allow the original clip of the division and the clip which is newly formed by the division to have the overlap portion. For example, in the original clip of the division and/or the new clip, the clip division is executed with sufficient time for the change timing so as to include the change point of the signal kind with respect to the time.

Figure 13:
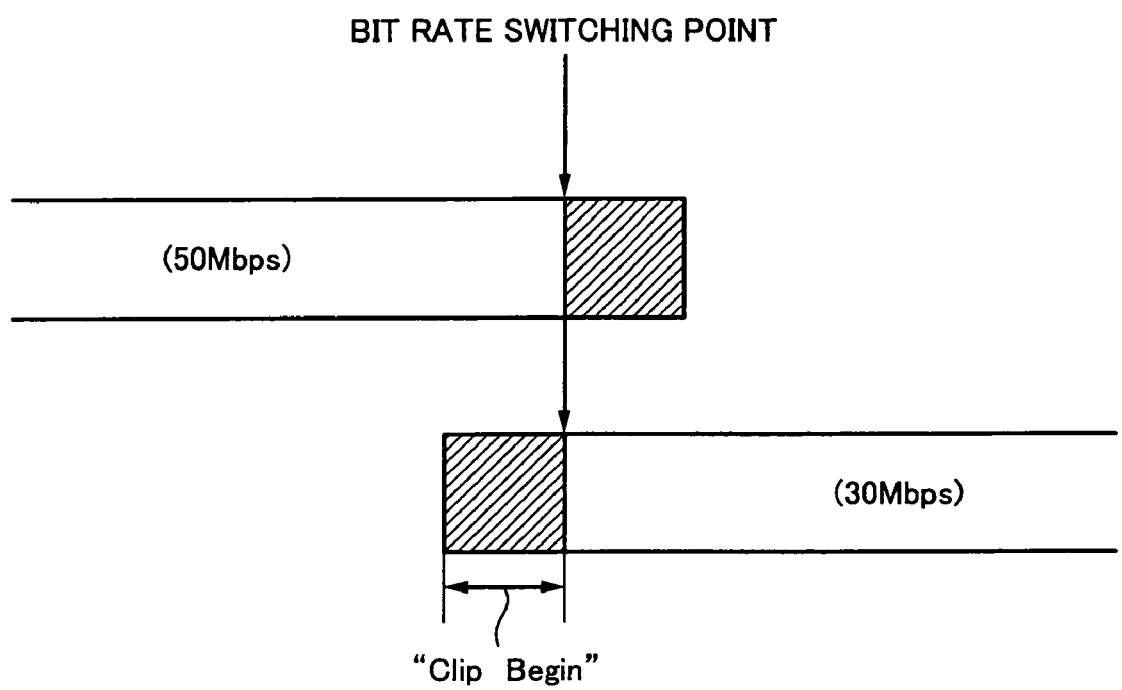
FIG. 13 is a diagram for explaining a process for allowing an original clip and a clip which is newly formed by the division at the time of the clip division to have an overlap portion.

As an example, a case where the initial bit rate of 50 Mbps is switched to 30 Mbps in the video data of the main line system will now be described with reference to FIG. 13. As shown in FIG. 13, in the video data whose bit rate is equal to 50 Mbps, the recording is executed additionally up to a position (hatched portion in the diagram) corresponding to a further predetermined time from a position where the switching of the bit rate has been designated while keeping the bit rate of 50 Mbps. On the other hand, the video data whose bit rate is equal to 30 Mbps is recorded at the bit rate of 30 Mbps from a preceding position (hatched region in the diagram) corresponding to a predetermined time from the position where the switching of the bit rate has been designated.

Since the bit rate switching point is set to the clip dividing position, it is necessary to adjust the start position of the clip for the head position of the actual file by using, for example, "clip Begin" as a command for designating the start position of the clip.

As for such recording, for example, in the video data of a base band before the compression encoding, each of the hatched portions in FIG. 13 is buffered and the data is compression encoded at the corresponding bit rate. For example, in the case of the video data of 50 Mbps, the file of the hatched portion can be added to the file according to the video data before the bit rate switching point. In this case, there is no need to actually add the file but a message indicative of such an adding process can be also described in the description to the foregoing edit list or the file "C0001C01.SMI" showing the clip information in the clip directory.

Naming rules of the clip directory names and the file name of each file in the clip directories are not limited to the foregoing examples. For instance, use of the foregoing UMIDs as file names or clip directory names is considered. As mentioned above, a data length of the UMID is equal to 64 bytes in the case of considering the expansion UMID also and is too long when it is used as a file name or the like. It is, therefore, desirable to use only a part of the UMID. For example, in the UMID, such a portion that a different value is obtained every clip is used as a file name or the like.

When the clip is divided, if the clip directory name or the file name is named so as to reflect the reasons for division of the clip, it is preferable in terms of the management of the clips. In this case, the naming is performed so that at least whether the clip division has been clearly performed by the user or has been performed by an automatic process on the apparatus side can be discriminated.

Figure 14:
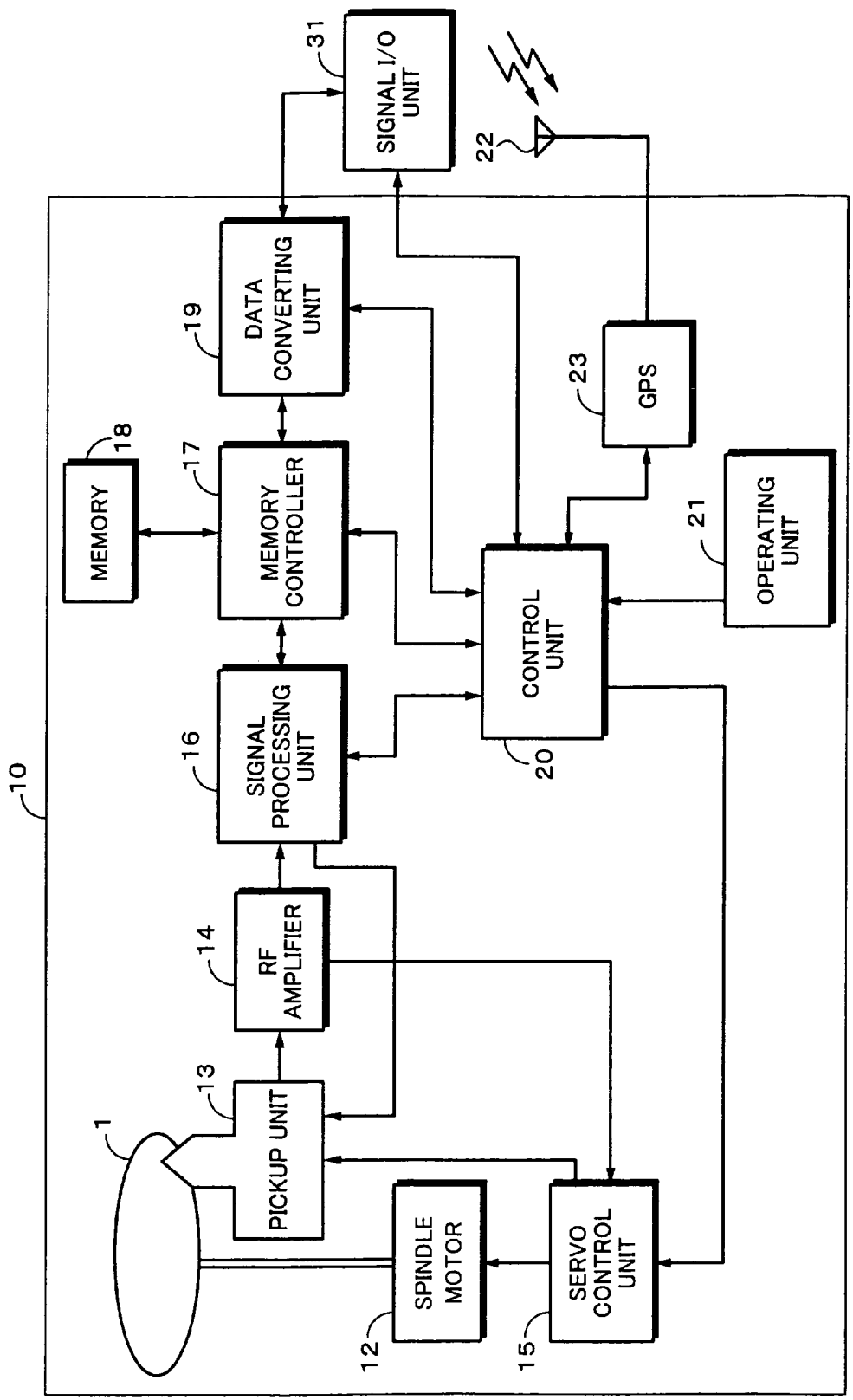
FIG. 14 is a block diagram showing a construction of an example of a disc recording/reproducing apparatus which can be applied to the embodiment of the invention.

FIG. 14 shows a construction of an example of a disc recording/reproducing apparatus 10 which can be applied to the embodiment of the invention. It is now assumed that the disc recording/reproducing apparatus 10 is a recording/reproducing unit built in a video camera (not shown). A video signal based on an image pickup signal of an object photographed by the video camera and an audio signal recorded in association with the photographing are inputted to a signal processing unit 31 and supplied to the disc recording/reproducing apparatus 10. The video signal and the audio signal outputted from the signal input/output unit 31 are supplied to, for example, a monitor apparatus.

Naturally, the disc recording/reproducing apparatus 10 is shown as an example and can be also an apparatus which is independently used. For example, it can be used by combining with a video camera having no recording unit. The video signal and the audio signal outputted from the video camera, a predetermined control signal, and data are inputted to the disc recording/reproducing apparatus 10 through the signal input/output unit 31. For instance, a video signal and an audio signal reproduced by another recording/reproducing apparatus can be also inputted to the signal input/output unit 31. The audio signal which is inputted to the signal input/output unit 31 is not limited to the signal which is inputted in association with the photographing of the video signal but can be also, for example, an after-recording audio signal for after-recording in which the audio signal is recorded in a desired interval of the video signal after the photographing.

A spindle motor 12 rotates the optical disc 1 at a CLV (Constant Linear Velocity) or a CAV (Constant Angler Velocity) on the basis of a spindle motor drive signal from a servo control unit 15.

A pickup unit 13 controls an output of a laser beam on the basis of a recording signal which is supplied from a signal processing unit 16 and records the recording signal onto the optical disc 1. The pickup unit 13 converges the laser beam, irradiates it onto the optical disc 1, photoelectrically converts the reflected light from the optical disc 1, forms a current signal, and supplies it to an RF (Radio Frequency) amplifier 14. The irradiating position of the laser beam is controlled to a predetermined position by a servo signal which is supplied from the servo control unit 15 to the pickup unit 13.

The RF amplifier 14 forms a focusing error signal, a tracking error signal, and a reproduction signal on the basis of the current signal from the pickup unit 13, supplies the tracking error signal and the focusing error signal to the servo control unit 15, and supplies the reproduction signal to the signal processing unit 16.

The servo control unit 15 controls a focusing servo operation and a tracking servo operation. Specifically speaking, the servo control unit 15 forms a focusing servo signal and a tracking servo signal on the basis of the focusing error signal and the tracking error signal from the RF amplifier 14 and supplies them to an actuator (not shown) of the pickup unit 13, respectively. The servo control unit 15 forms a spindle motor drive signal to drive the spindle motor 12 and controls the spindle servo operation for rotating the optical disc 1 at a predetermined rotational speed.

Further, the servo control unit 15 makes sled control for moving the pickup unit 13 in the radial direction of the optical disc 1 and changing the irradiating position of the laser beam. The setting of the signal reading position of the optical disc 1 is performed by a control unit 20 and the position of the pickup unit 13 is controlled so that the signal can be read out from the set reading position.

The signal processing unit 16 modulates recording data which is inputted from a memory controller 17, forms the recording signal, and supplies it to the pickup unit 13. The signal processing unit 16 demodulates the reproduction signal from the RF amplifier 14, forms reproduction data, and supplies it to the memory controller 17.

The memory controller 17 properly stores recording data from a data converting unit 19 into the memory 18 as will be explained hereinafter, reads out it, and supplies it to the signal processing unit 16. The memory controller 17 also properly stores the reproduction data from the signal processing unit 16 into the memory 18, reads out it, and supplies it to the data converting unit 19.

The video signal and audio signal based on the image photographed by the video camera are supplied to the data converting unit 19 through the signal input/output unit 31. As will be explained in detail hereinafter, in the data converting unit 19, the supplied video signal is compression encoded in a mode instructed by the control unit 20 by using a compression encoding system such as MPEG2 or the like, thereby forming the video data of the main line system. At this time, a compression encoding process of a lower bit rate is also executed and the auxiliary AV data is formed.

In the data converting unit 19, the supplied audio signal is compression encoded by a system instructed in the control unit 20 and outputted as audio data of the main line system. In the case of the audio signal, it can be also outputted as it is as linear PCM audio data without being compression encoded.

The audio data and video data of the main line system which were processed as mentioned above in the data converting unit 19 and the auxiliary AV data are supplied to the memory controller 17.

The data converting unit 19 also decodes the reproduction data supplied from the memory controller 17 as necessary, converts it into an output signal in a predetermined format, and supplies it to the signal input/output unit 31.

The control unit 20 comprises: a CPU (Central Processing Unit); a memory such as ROM (Read Only Memory), RAM (Random Access Memory), or the like; a bus for connecting them; and the like. The control unit 20 controls the whole disc recording/reproducing apparatus 10. An initial program which is read out upon activation of the CPU, a program for controlling the disc recording/reproducing apparatus 10, and the like are previously stored in the ROM. The RAM is used as a work memory of the CPU. A video camera unit is also controlled by the control unit 20.

Further, a file system at the time when the data is recorded onto the optical disc 1 and the recorded data is reproduced by the control unit 20 in accordance with the programs which have previously been stored in the ROM is provided. That is, in the disc recording/reproducing apparatus 10, the recording of the data to the optical disc 1 and the reproduction of the data from the optical disc 1 are executed under the management of the control unit 20.

An operating unit 21 is operated by, for example, the user and supplies an operation signal corresponding to the operation to the control unit 20. On the basis of the operation signal from the operating unit 21, the control unit 20 controls the servo control unit 15, signal processing unit 16, memory controller 17, and data converting unit 19, thereby allowing the recording and reproducing processes to be executed.

The setting of, for example, a bit rate, a frame rate, an image size, and an image aspect ratio for the recording video data and the like are executed on the basis of the operation signal from the operating unit 21. Further, the setting of ON/OFF of the compression encoding process for the recording audio data and the bit resolution can be also executed from the operating unit 21. Control signals based on those settings are supplied to the memory controller 17 and the data converting unit 19.

The disc recording/reproducing apparatus 10 has: an antenna 22 for receiving a signal by the GPS; and a GPS unit 23 for analyzing the GPS signal received by the antenna 22 and outputting position information comprising a latitude, a longitude, and an altitude. The position information outputted from the GPS unit 23 is supplied to the control unit 20. The antenna 22 and the GPS unit 23 can be provided for the video camera unit or can be also externally attached as apparatuses to the outside of the disc recording/reproducing apparatus 10.

Figure 15:
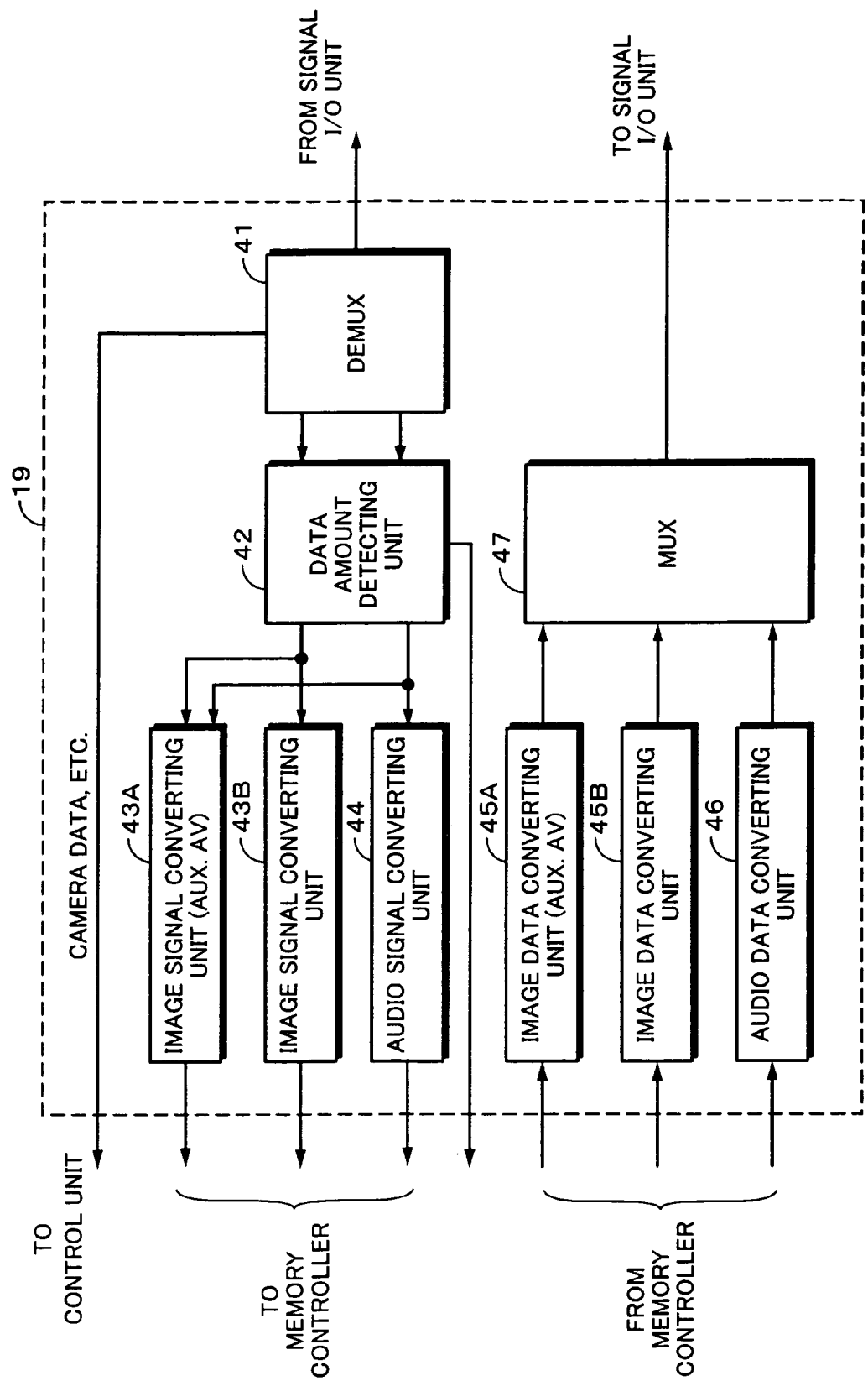
FIG. 15 is a block diagram showing a construction of an example of a data converting unit.

FIG. 15 shows a construction of an example of the data converting unit 19. When the data is recorded to the optical disc 1, the recording signal inputted from the signal input/output unit 31 is supplied to a demultiplexer 41. A video signal of a motion image and an audio signal accompanied with the video signal are inputted from the video camera unit to the signal input/output unit 31. The photographing information of the camera, for example, information regarding an iris and a zoom is inputted as camera data in a real-time manner.

The demultiplexer 41 separates a plurality of associated data series, that is, for example, the video signal of the motion image and the audio signal accompanied with the video signal from the signal supplied from the signal input/output unit 31 and supplies them to a data amount detecting unit 42. Further, the demultiplexer 41 separates the camera data from the signal supplied from the signal input/output unit 31 and outputs it. The camera data is supplied to the control unit 20.

The data amount detecting unit 42 supplies the video signal and audio signal supplied from the demultiplexer 41 as they are to image signal converting units 43A and 43B and an audio signal converting unit 44, respectively. The data amount detecting unit 42 detects data amounts of the video signal and audio signal and supplies them to the memory controller 17. That is, the data amount detecting unit 42 detects the data amount of, for example, a predetermined reproducing time with respect to each of the video signal and audio signal supplied from the demultiplexer 41 and supplies to the memory controller 17.

The image signal converting unit 43B compression encodes the video signal supplied from the data amount detecting unit 42 by, for example, the MPEG2 system in accordance with an instruction from the control unit 20 and supplies a data series of the video data thus obtained to the memory controller 17. A maximum bit rate of a generation code amount by, for example, the compression encoding is set into the image signal converting unit 43B by the control unit 20. The image signal converting unit 43B estimates a data amount of one frame after the compression encoding, controls the compression encoding process on the basis of an estimation result, and executes the actual compression encoding process to the video data so that the generation code amount lies within the set maximum bit rate. A difference between the set maximum bit rate and the data amount by the actual compression encoding is filled with, for example, predetermined padding data, thereby maintaining the maximum bit rate. A data series of the compression encoded video data is supplied to the memory controller 17.

The image signal converting unit 43A compression encodes the video signal supplied from the data amount detecting unit 42 by, for example, the MPEG4 system in accordance with an instruction from the control unit 20 and forms the auxiliary AV data. In the embodiment, at this time, the bit rate is fixed to a few Mbps and the GOP is formed by 10 frames comprising one I picture and 9 P pictures.

When the audio signal supplied from the data amount detecting unit 42 is not the linear PCM audio data, the audio signal converting unit 44 converts this audio signal into the linear PCM audio data in accordance with an instruction from the control unit 20. The invention is not limited to such an example but in the audio signal converting unit 44, the audio signal can be also compression encoded by, for example, an MP3 (Moving Pictures Experts Group 1 Audio Layer 3) system, an AAC (Advanced Audio Coding) system, or the like according to the MPEG system. The compression encoding system of the audio data is not limited to them but another system can be used. The data series of the audio data which is outputted from the audio signal converting unit 44 is supplied to the memory controller 17.

The above construction is shown as an example and the invention is not limited to it. For example, if the AV data, camera data, and the like of the main line system are independently inputted to the signal input/output unit 31, the demultiplexer 41 can be omitted. If the audio data of the main line system is the linear PCM audio data, the processes in the audio signal converting unit 44 can be also omitted.

The video data and audio data supplied to the memory controller 17 are supplied to the optical disc 1 and recorded as mentioned above.

The recording is executed while annual rings are formed onto the optical disc 1 as mentioned above. For example, in the audio data, when the data amount detecting unit 42 of the data converting unit 19 detects the audio data necessary for reproduction of a time corresponding to one annual ring data, it notifies the memory controller 17 of such a fact. In response to it, the memory controller 17 discriminates whether or not the audio data necessary for reproduction of a time corresponding to one annual ring data has been stored in a memory 18 and notifies the control unit 20 of a discrimination result. On the basis of the discrimination result, the control unit 20 controls the memory controller 17 so as to read out the audio data corresponding to the reproducing time of one annual ring data from the memory 18. The audio data is read out from the memory 18 by the memory controller 17, supplied to the signal processing unit 16, and recorded onto the optical disc 1.

When the audio data corresponding to the reproducing time of one annual ring data is recorded, subsequently, similar processes are executed to, for example, the video data. The video annual ring data corresponding to one annual ring data is recorded next to the audio annual ring data. Similarly, the auxiliary AV data corresponding to the reproducing time of one annual ring data is sequentially recorded.

With respect to the time-sequential meta data, for example, the camera data is supplied from the demultiplexer 41 to the control unit 20 and some data such as UMID and the like in the time-sequential meta data is formed by the control unit 20. The camera data and the data formed by the control unit 20 are collectively handled as time-sequential meta data and stored into the memory 18 through the memory controller 17. In a manner similar to the above, the memory controller 17 reads out the time-sequential meta data corresponding to the reproducing time of one annual ring data from the memory 18 and supplies it to the signal processing unit 16.

In the control unit 20, the non-time-sequential meta data is also formed. The non-time-sequential meta data is recorded into the clip directory of the clip to which such data belongs.

The data which is recorded onto the optical disc 1 as mentioned above is stored into the files and managed by the directory structure as already described with reference to FIGS. 8, 9, and 10. For example, when the data is recorded onto the optical disc 1, the management information such as address information of each file, pointer information in the directory structure, file name and directory name information, and the like is recorded into a predetermined management area on the optical disc 1. The recorded file information and the like are reflected to the index file "INDEX.XML".

When the data is reproduced from the optical disc 1, the video data, audio data, auxiliary AV data, and time-sequential meta data are read out from the optical disc 1 as mentioned above. At this time, the data of a low bit rate such as audio data, auxiliary AV data, and time-sequential meta data of the main line system is also reproduced at the reproducing speed of the video data of the main line system having a high bit rate and the reproducing speed of the data from the optical disc 1 is not changed. The video data and auxiliary AV data read out from the optical disc 1 are supplied to image data converting units 45B and 45A from the memory controller 17, respectively. The audio data is supplied from the memory controller 17 to an audio data converting unit 46.

The image data converting units 45A and 45B decode the data series of the auxiliary AV data and the video data of the main line system which are supplied from the memory controller 17 and supply a video signal thus obtained to a multiplexer 47. The audio data converting unit 46 decodes the data series of the audio data which is supplied from the memory controller 17 and supplies an audio signal thus obtained to the multiplexer 47.

It is also possible to construct in such a manner that in the image data converting units 45A and 45B and the audio data converting unit 46, the supplied reproduction data is not decoded but supplied as it is to the multiplexer 47, multiplexed, and outputted. Further, it is also possible to omit the multiplexer 47 and independently output those data.

In the disc recording/reproducing apparatus 10 constructed as mentioned above, when the user instructs the recording of the data by operating the operating unit 21, the data which is supplied from the signal input/output unit 31 is supplied to the optical disc 1 through the data converting unit 19, memory controller 17, signal processing unit 16, and pickup unit 13 and recorded.

Upon recording, the user can change the bit rate of the video data of the main line system by operating the operating unit 21. For example, there is considered a using method whereby the bit rate is set to 50 Mbps and the recording is executed, and when a recordable area on the optical disc 1 decreases, the bit rate is changed to a low bit rate such as 30 Mbps, thereby preventing such a situation to miss the recording, or the like.

At this time, in correspondence to the timing for changing the bit rate, the clip is divided and the data after the change is recorded as a new clip onto the optical disc 1. The change in bit rate can be detected by detecting the operation performed to the operating unit 21 or can be detected on the basis of a result of monitoring of the bit rate of the video data by the control unit 20. For example, in the memory controller 17, it is also possible that the data at a predetermined position where the bit rate information is described in the header of the video data of the main line system supplied from the data converting unit 19 is extracted and the fact that the bit rate has been changed is detected.

When the change in bit rate is detected, for example, the memory controller 17 is controlled by the control unit 20, the data before the change in bit rate is swept out from the memory 18 and recorded onto the optical disc 1, and new annual rings are formed by the data after the change.

When the change in video data of the main line system is detected, other data, that is, the audio data of the main line system, the auxiliary AV data, and the time-sequential meta data are similarly controlled by the memory controller 17 and the clip is divided. At this time, as mentioned above, the AV data of the main line system can be divided in accordance with the GOP boundary of the auxiliary AV data.

When the bit rate of the video data of the main line system is changed, if the bit rate of the actual video data is gradually changed, since an unnatural image change does not appear on the reproduced image, it is preferable.

Figure 16:
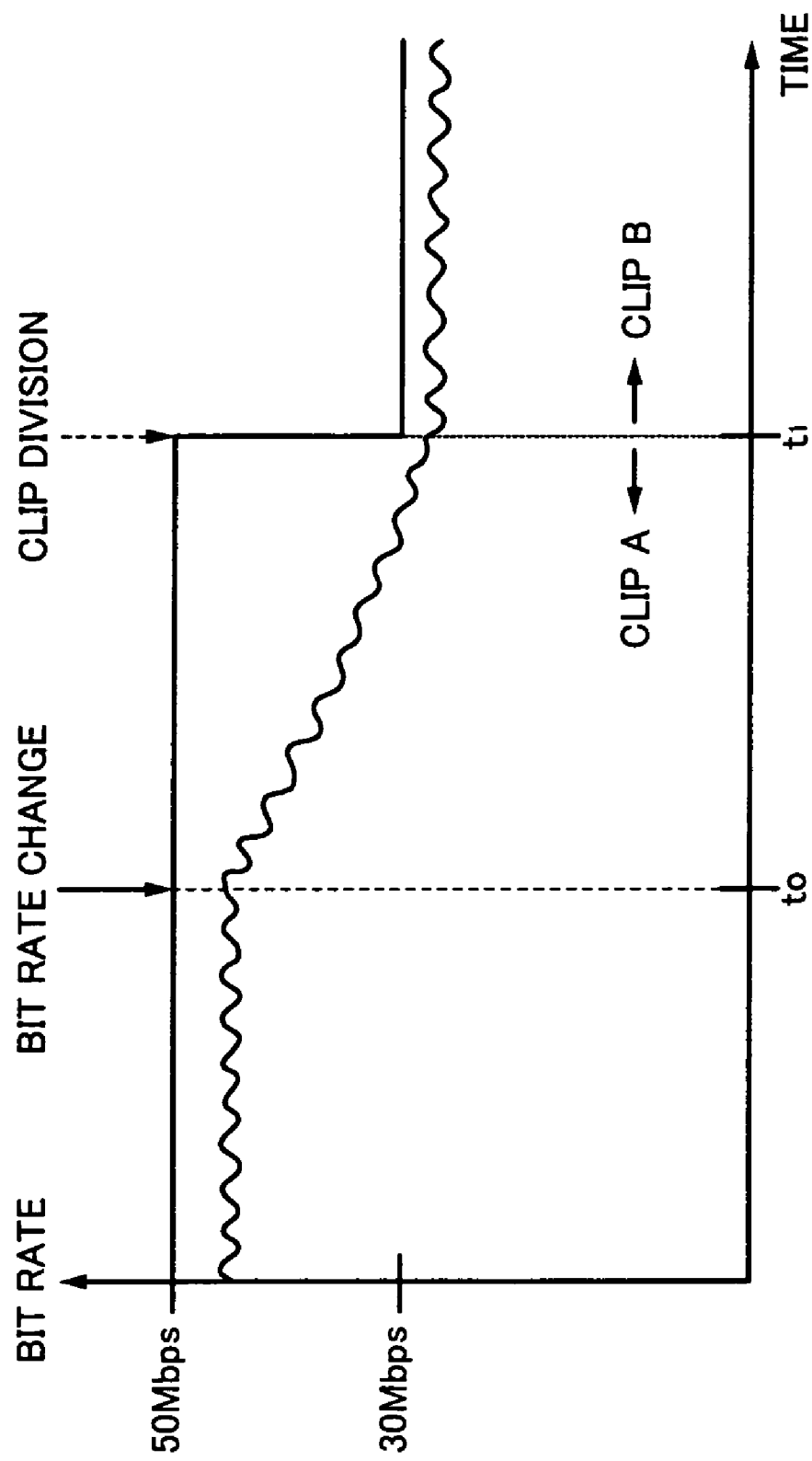
FIG. 16 is a diagram for explaining that when a bit rate is changed, a bit rate of actual video data is gradually changed.

First, the case of changing the bit rate from the high bit rate to the low bit rate will be described with reference to FIG. 16. It is assumed that the bit rate mode has initially been set to 50

Mbps. By the operation to the operating unit 21 during the recording, an instruction is made so as to change the bit rate mode to 30 Mbps at time $t_0$. In response to such an instruction, the control unit 20 instructs the image signal converting unit 43B of the data converting unit 19 to change the bit rate. At this time, a time constant process is executed to a changing speed of the bit rate so that the bit rate decreases gradually at time $t_1$, as a target, after a predetermined time from time $t_0$. Time $t_1$ is set to an actual change point of the bit rate and the clip division is executed at this point.

In this case, even if the change in bit rate is instructed at time $t_0$, actually, the data is handled as video data of the bit rate mode before the change until the arrival at time $t_1$. For example, the difference between the data amount according to the bit rate designated by the bit rate mode and the actual generation code amount by the compression encoding is filled with predetermined padding data.

Processes opposite to the foregoing processes are executed in the case of changing the bit rate from the low bit rate to the high bit rate. That is, for example, in the case of changing the bit rate which has initially been set to 30 Mbps to 50 Mbps, first, the bit rate mode is changed from 30 Mbps to 50 Mbps at the change instructing timing. The control unit 20 instructs the image signal converting unit 43B of the data converting unit 19 so as to execute the time constant process to the changing speed of the bit rate so that the bit rate is gradually increased for a predetermined time. For example, the difference between the data amount according to the bit rate designated by the bit rate mode and the actual generation code amount by the compression encoding is filled with predetermined padding data. The clip division is executed, for example, at the change point of the bit rate mode.

The control unit 20 instructs the bit rate of a small value little by little to the image signal converting unit 43B at predetermined time intervals, thereby enabling the bit rate to be gradually changed as mentioned above. In the image signal converting unit 43B, a total code amount of the frame after the encoding is estimated in accordance with the value of the bit rate instructed so that its value decreases gradually, and the encoding process is executed in accordance with the estimated value.

With respect to the audio data, on the other hand, for example, it is possible to cope with a change in bit resolution of the audio data of the main line system inputted as linear PCM audio data. When such a change is detected, the clip is divided at the change point in a manner similar to the case of the foregoing video data. The clip division can be also performed here in accordance with the GOP boundary of the auxiliary AV data.

In the case of the audio data, it is possible to construct in such a manner that, the bit resolution before the change is maintained after the change in bit resolution and the clip division due to the change in bit resolution is not executed. For example, when the audio data which is inputted from the outside to the disc recording/reproducing apparatus 10 according to the embodiment of the invention is recorded onto the optical disc 1, in the case where the bit resolution of the inputted audio data which has initially been equal to 24 bits is changed to 16 bits at a certain time point, the bit resolution can be held to 24 bits even after the change in bit resolution.

With respect to the audio data, "the bit resolution of 24 bits" and "the bit resolution of 16 bits" are hereinbelow properly referred to as "24 bits" and "16 bits", respectively.

Explanation will now be made with reference to FIGS. 17A and 17B. The audio data which has been inputted initially at the resolution of 24 bits is changed to the bit resolution of 16 bits at the bit resolution change point (FIG. 17A). At this time, as shown in an example in FIG. 17B, data showing "silence" (for example, value "0") in the audio data is added to 8 bits on the lower side (LSB side) of the audio data changed to 16 bits, thereby forming the data of 24 bits as a whole. At this time, the data of 8 bits to be added is not limited to "silence" but a dither can be also added.

For example, also in the case where the audio data which has initially been set to 16 bits is changed to 24 bits, the bit resolution can be similarly held to 16 bits even after the change in bit resolution.

Explanation will now be made with reference to FIGS. 18A and 18B. The audio data which has been inputted initially at the resolution of 16 bits is changed to the bit resolution of 24 bits at the bit resolution change point (FIG. 18A). At this time, as shown in an example in FIG. 18B, 8 bits on the lower side (LSB side) of the audio data inputted at 24 bits are omitted, thereby forming the data of 16 bits as a whole.

Further, when the audio data inputted as linear PCM audio data is changed to the audio data encoded by an encoding system other than the linear PCM (hereinafter, referred to as non-audio audio data), the non-audio audio data is muted and the recording can be continued without dividing the clip. The muting can be performed by, for example, recording audio data indicative of "silence", and the non-audio audio data is recorded as audio data of "silence". The non-audio audio data is replaced with audio data showing "silence".

When the non-audio audio data is changed to the linear PCM audio data, the linear PCM audio data can be recorded by the clips after the division.

The converting process of the bit resolution of the audio data and the silence process at the time of input of the non-audio audio data as mentioned above can be executed, for example, by the audio signal converting unit 45 based on an instruction of the control unit 20. The invention is not limited to such an example but they can be also executed by processes at the time of reading out the audio data from the memory 18 by the control of the memory controller 17 based on an instruction of the control unit 20. For example, data showing the non-audio audio data of, for example, one sample has previously been stored in the memory 18 and such data is repetitively read out.

In the case where the audio data is transmitted in the format based on the standard according to AES/EBU (Audio Engineering Society/European Broadcasting Union) which is generally used in, for example, a broadcasting station or the like, since the information of the bit resolution is stored in a predetermined position of the header, by extracting such data, the resolution of the audio data can be discriminated. The linear PCM audio data and the non-audio audio data can be also similarly distinguished by the header information or the like.

Although the change in bit rate during the recording of the video data of the main line system has been described above, the invention is not limited to such an example but the disc recording/reproducing apparatus 10 according to the embodiment of the invention can be also cope with a change in frame rate during the recording, a change in image size or aspect ratio, or the like. In this case, upon reproduction, by executing interpolating/decimating processes in the time base direction upon changing the frame rate or executing interpolating/decimating processes in the frame upon changing the image size or aspect ratio, the video data can be outputted at the predetermined frame rate, image size, and image aspect ratio. Such interpolating/decimating processes are executed by, for example, the memory controller 17 to the video data stored in the memory 18. They can be also executed in the image signal converting unit 43B.

Although the explanation has been made above on the assumption that MPEG2 is used as an encoding system of the video data of the main line system, the invention is not limited to such an example but video data encoded by another system can be also further mixedly recorded. With respect to the bit rate of the video data and other parameters as well, it is also possible to cope with a bit rate and parameters other than those mentioned above.

With respect to the audio data as well, when it is encoded into the non-audio audio data, further another encoding system can be also similarly used. With respect to the audio data as well, the bit resolution is not limited to 16 bits and 24 bits but audio data of other bit resolution such as 32 bits, 8 bits, 12 bits, etc. can be mixedly recorded. Although a sampling frequency of the audio data is set to 48 kHz as a standard value, the invention is also not limited to such an example but audio data of other sampling frequencies such as 96 kHz, 192 kHz, etc. can be mixedly recorded.

Further, the auxiliary AV data is also not limited to the MPEG4 system but video data encoded by another system can be mixedly recorded.

Moreover, it is preferable if a list of clips recorded on the optical disc 1 can be displayed onto a monitor apparatus (not shown) or the like. For instance, the index file "INDEX.XML" is read out in accordance with the operation to the operating unit 21 by the user and information of all clips recorded on the optical disc 1 is obtained. A thumbnail image is automatically formed on the basis of the auxiliary AV data with reference to each clip directory. The thumbnail image is formed each time by, for example, reading out the frame in a predetermined position of the auxiliary AV data and reducing it to a predetermined image size, or the like.

Thumbnail image data of each clip is supplied to the memory controller 17 and stored into the memory 18. The thumbnail image data stored in the memory 18 is read out by the memory controller 17, supplied to the monitor apparatus (not shown) through the data converting unit 19 and the signal input/output unit 31, and a list of the thumbnail images is displayed onto the monitor apparatus. Display control of the thumbnail images to the monitor apparatus can be made by the operation from the operating unit 21. By a predetermined operation to the operating unit 21, a desired image can be selected from the thumbnail images and the clip corresponding to the selected thumbnail image can be reproduced.

When the thumbnail image is displayed onto the monitor apparatus as mentioned above, various information of the clip corresponding to the displayed thumbnail image, for example, the bit rate of the video data of the main line system, the encoding system, and the like can be displayed together with the thumbnail image. Such a process can be realized by reading out the time-sequential meta data and non-time-sequential meta data from each clip directory.

Although the optical disc is used as a recording medium in the above explanation, the invention can be also applied to another kind of recording medium such as a semiconductor memory or the like so long as it is a recording medium on which the data is recorded as a file.

As described above, in the invention, when the format of one of the audio data, the video data, the auxiliary AV data, and the time-sequential meta data of the main line system is changed during the recording, the clip division is executed at the position corresponding to the change point. Therefore, there is such an effect that the data in a plurality of different formats can be mixedly recorded onto one disc-shaped recording medium so that they can be continuously reproduced.

The invention claimed is:

1. A recording apparatus for recording first video data and data which time-sequentially corresponds to said first video data onto a disc-shaped recording medium, comprising:
    a detecting device for detecting a change in format of at least one of the first video data, which is continuously supplied, and the data which is supplied to time-sequentially correspond to the first video data,
    a control unit for recording, when the detecting device detects a change in format, each of said first video data and said data which is supplied to time-sequentially correspond to said first video data divided at a position corresponding to said change onto said disc-shaped recording medium,
    wherein, when a change in format is detected during recording the first video data or the data which is supplied to time-sequentially correspond to the said first video data, a new directory is formed and recording of the data in the changed format is recorded in a file in the newly formed directory, and
    wherein mixture of different formats among the directories is permitted but the mixture of the different formats in the files stored in the new directory is not permitted.

2. A recording apparatus according to claim 1, wherein the data which time-sequentially corresponds to said first video data is at least second video data, the second data being based on said first video data and having a transmission rate is lower than that of said first video data.

3. A recording apparatus according to claim 2, wherein when said second video data is arranged with a group of pictures as a unit of random access of said second video data, division is executed at a boundary position of the unit in which random access of said second video data can be performed.

4. A recording apparatus according to claim 2, wherein in the case where when said second video data is arranged with a plurality of frames as a unit of random access of said second video data, said dividing position does not coincide with the boundary of said unit of random access, said boundary is forcedly made coincident with said dividing position.

5. A recording apparatus according to claim 1, wherein the data which time-sequentially corresponds to said first video data is at least audio data.

6. A recording apparatus according to claim 5, wherein said audio data is audio data which has been encoded by linear PCM or audio data which has been encoded by an encoding system other than linear PCM data, and said format change is a change between the audio data encoded by said linear PCM and the audio data encoded by the encoding system other than said linear PCM.

7. A recording apparatus according to claim 1, wherein the data which time-sequentially corresponds to said first video data is at least meta data corresponding to said first video data.

8. A recording apparatus according to claim 1, wherein in the case where a random access unit of said first video data comprises a plurality of frames and said dividing position does not coincide with a boundary of said random access unit, said boundary is forcedly made coincident with said dividing position.

9. A recording apparatus according to claim 1, wherein the data which time-sequentially corresponds to said first video data comprises:

second video data which is the data based on said first video data and whose transmission rate is lower than that of said first video data;

audio data; and meta data for said first video data.

10. A recording apparatus according to claim 9, wherein said division is executed at a boundary position of a unit in which random access of said second video data can be performed.

11. A recording apparatus according to claim 9, wherein said audio data is audio data which has been encoded by linear PCM or audio data which has been encoded by an encoding system other than linear PCM data, and said format change is a change between the audio data encoded by said linear PCM and said audio data encoded by the encoding system other than said linear PCM.

12. A recording method of recording first video data and data which time-sequentially corresponds to said first video data onto a disc-shaped recording medium, comprising:

detecting, by a data converting unit that monitors a format of the first video data and a format of the data which time-sequentially correspond to the first video data, a change in at least one of the first video data, which is continuously supplied, and the data which is supplied to time-sequentially correspond to the first video data, recording, when the data converting unit detects a change in format, each of said first video data and said data which is supplied to time-sequentially correspond to said first video data divided at a position corresponding to said change onto said disc-shaped recording medium, wherein, when a change in format is detected during recording the first video data or the data which is supplied to time-sequentially correspond to the said first video data, a new directory is formed and recording of the data in the changed format is recorded in a file the newly formed directory, and wherein mixture of different formats among the directories is permitted but the mixture of the different formats in the files stored in the new directory is not permitted.

* * * * *

UNITED STATES PATENT AND TRADEMARK OFFICE
CERTIFICATE OF CORRECTION

PATENT NO.      : 7,606,466 B2
APPLICATION NO. : 10/516706
DATED           : October 20, 2009
INVENTOR(S)     : Shinkai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1309 days.

Signed and Sealed this

Twelfth Day of October, 2010

David J. Kappos
*Director of the United States Patent and Trademark Office*